(12) United States Patent
Schombert

(10) Patent No.: US 10,479,539 B2
(45) Date of Patent: Nov. 19, 2019

(54) HEAVY DUTY CENTRIFUGAL FEEDER DEVICE AND SYSTEM

(71) Applicant: Greg Schombert, Knightstown, IN (US)

(72) Inventor: Greg Schombert, Knightstown, IN (US)

( * ) Notice: Subject to any disclaimer, the term of this patent is extended or adjusted under 35 U.S.C. 154(b) by 0 days.

(21) Appl. No.: 15/958,886

(22) Filed: Apr. 20, 2018

(65) Prior Publication Data

US 2018/0305053 A1    Oct. 25, 2018

Related U.S. Application Data

(60) Provisional application No. 62/488,777, filed on Apr. 23, 2017.

(51) Int. Cl.
| | | |
|---|---|---|
| *B65B 37/12* | (2006.01) | |
| *B65B 1/14* | (2006.01) | |
| *B65G 47/14* | (2006.01) | |
| *B65B 35/26* | (2006.01) | |

(52) U.S. Cl.
CPC ............. *B65B 37/12* (2013.01); *B65B 1/14* (2013.01); *B65B 35/26* (2013.01); *B65G 47/1421* (2013.01); *B65G 47/1464* (2013.01); *B65B 2220/14* (2013.01)

(58) Field of Classification Search
CPC .......... B65B 37/12; B65B 1/14; B65B 35/26; B65B 2220/14; B65G 47/1464; B65G 47/1421; B65G 47/1442; B65G 47/1457
See application file for complete search history.

(56) References Cited

U.S. PATENT DOCUMENTS

| | | | |
|---|---|---|---|
| 1,590,124 A * | 6/1926 | Roble .................... | A63D 5/08 473/91 |
| 3,123,201 A * | 3/1964 | Dowd et al. ............ | A63D 5/08 198/803.14 |
| 3,658,207 A | 4/1972 | Schultz | |
| 3,704,888 A * | 12/1972 | Kleineaschoff .......... | A63D 5/08 473/112 |
| 3,912,120 A | 10/1975 | Hoppman et al. | |
| 4,007,854 A * | 2/1977 | Ervine ............... | B65G 47/1464 198/392 |
| 4,272,366 A | 6/1981 | Dean et al. | |
| 4,444,303 A | 4/1984 | Burgess et al. | |
| 4,493,459 A | 1/1985 | Burkett | |
| 4,830,172 A | 5/1989 | Hilton et al. | |
| 4,884,678 A | 12/1989 | Graham et al. | |

(Continued)

*Primary Examiner* — Mark A Deuble
(74) *Attorney, Agent, or Firm* — John D Ritchison; Ritchison Law Offices, PC

(57) ABSTRACT

A centrifugal bowl parts feeder system for various relatively heavy parts feeding including automotive bearings, gears, castings and other small, rugged and heavy part—1 to 6 inches in diameter and ½ to 5 pounds apiece. The components for this heavy duty centrifugal parts feeder system embraces a feeder bowl system with a durable, high impact bowl and surface, a drive assembly and a shaft connected to an inner disk, a set of selection tooling to separate and organize the parts, and a heavy support structure contiguous and beneath the inner disk. The system also contains both an input and output parts conveyor. All the components permit the heavy duty centrifugal bowl parts feeder system to feed and orient the relatively heavy, rugged and small.

9 Claims, 14 Drawing Sheets

(56) References Cited

U.S. PATENT DOCUMENTS

| | | | |
|---|---|---|---|
| 5,145,051 A * | 9/1992 | Hoppmann | B65G 47/1457 198/392 |
| 5,419,442 A | 5/1995 | Wright, Jr. | |
| 5,474,493 A * | 12/1995 | Tolbert | B65G 47/1457 198/392 |
| 5,853,077 A | 12/1998 | Schmitt | |
| 5,954,185 A | 9/1999 | Eshelman et al. | |
| 6,578,699 B2 | 6/2003 | Baird et al. | |
| 7,472,782 B2 | 1/2009 | Corbin | |
| 7,740,125 B2 | 6/2010 | DerMarderosian et al. | |
| 7,789,215 B1 | 9/2010 | Snyder | |
| 8,074,782 B2 | 12/2011 | Cgarpentier et al. | |
| 9,211,962 B2 | 12/2015 | Kerkeslager et al. | |
| 2005/0178082 A1* | 8/2005 | Milot | B65G 47/1464 52/749.13 |
| 2014/0116843 A1* | 5/2014 | Kerkeslager | B65G 47/1464 198/392 |

* cited by examiner

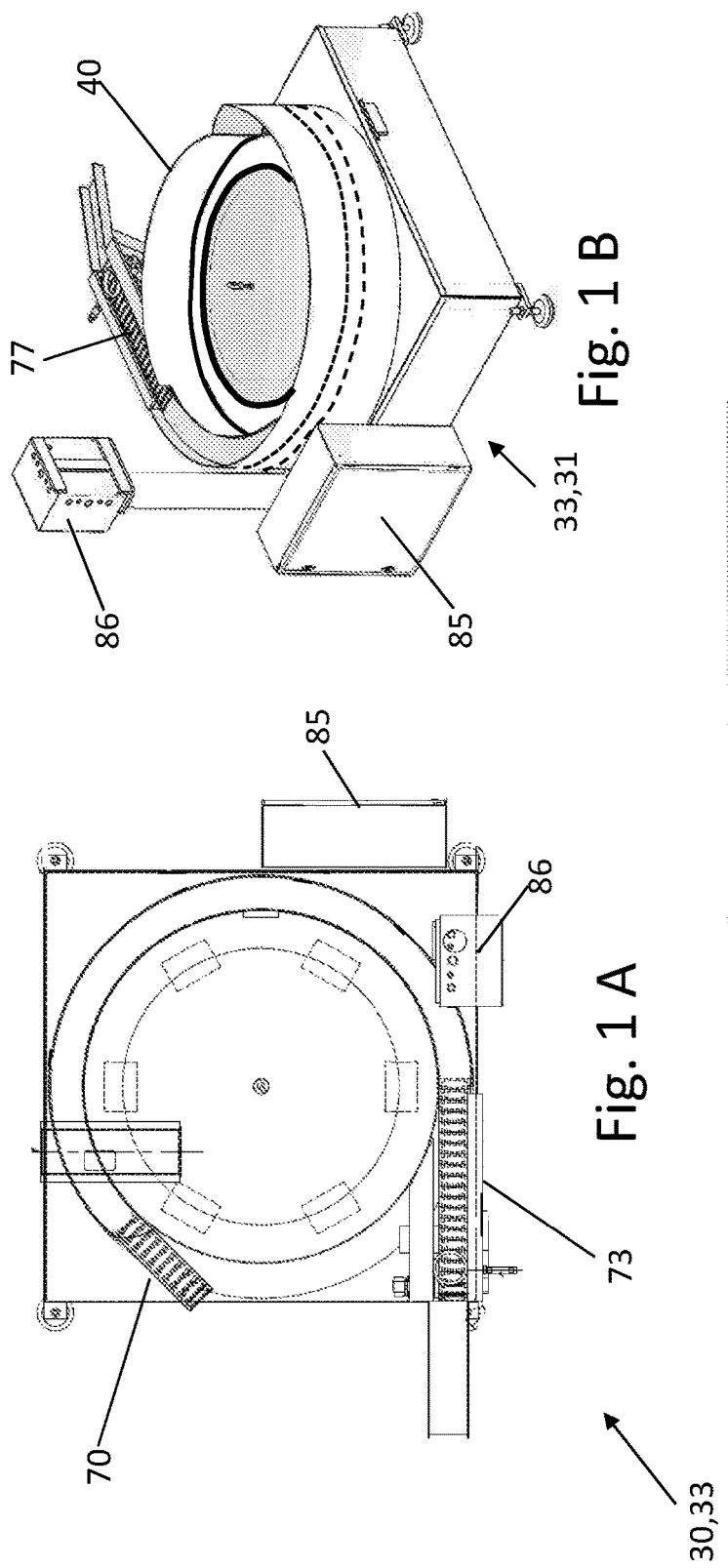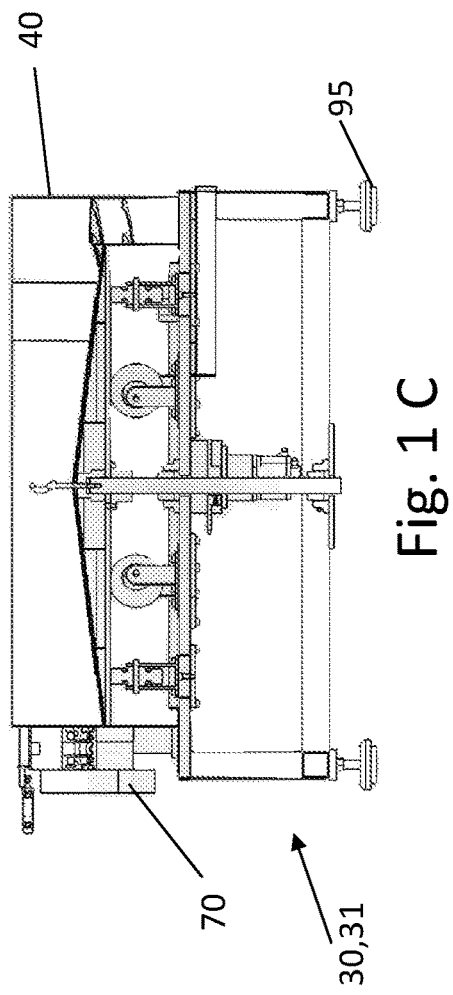

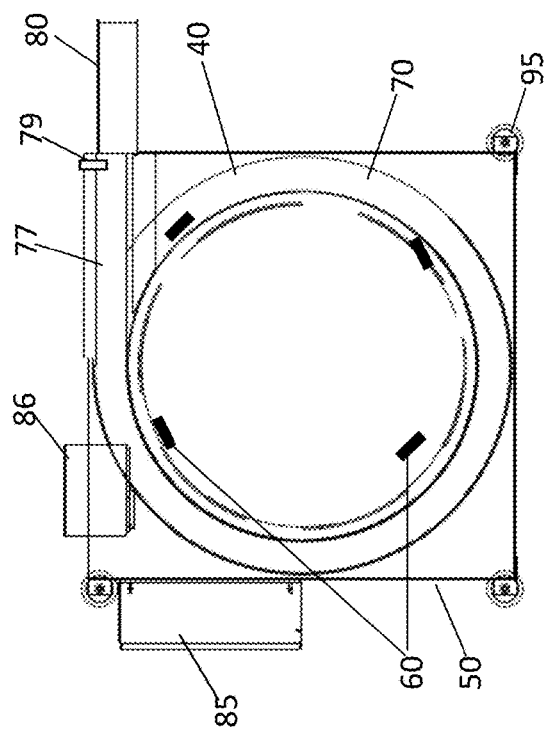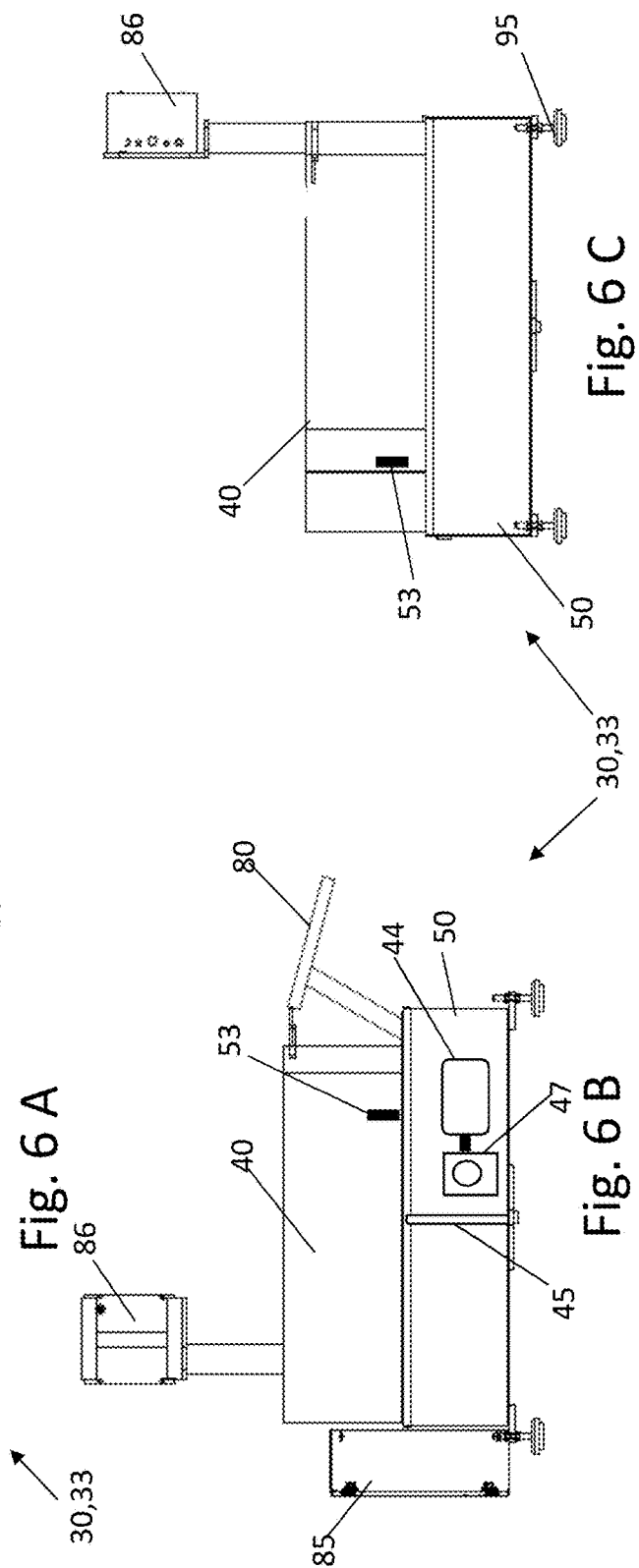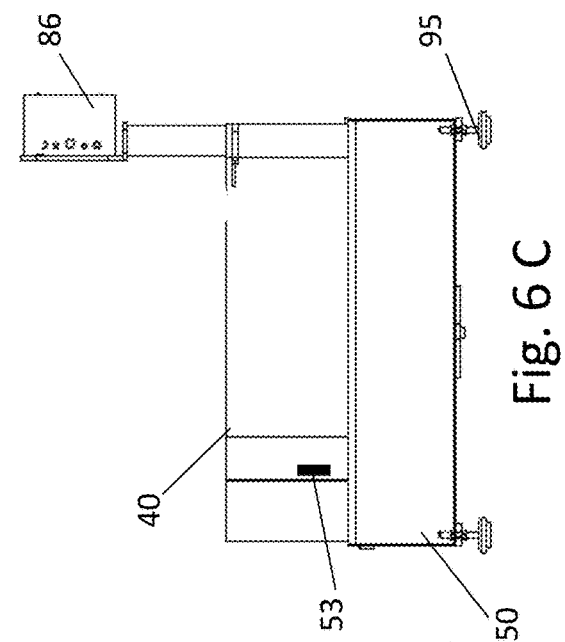
Fig. 6A
Fig. 6B
Fig. 6C

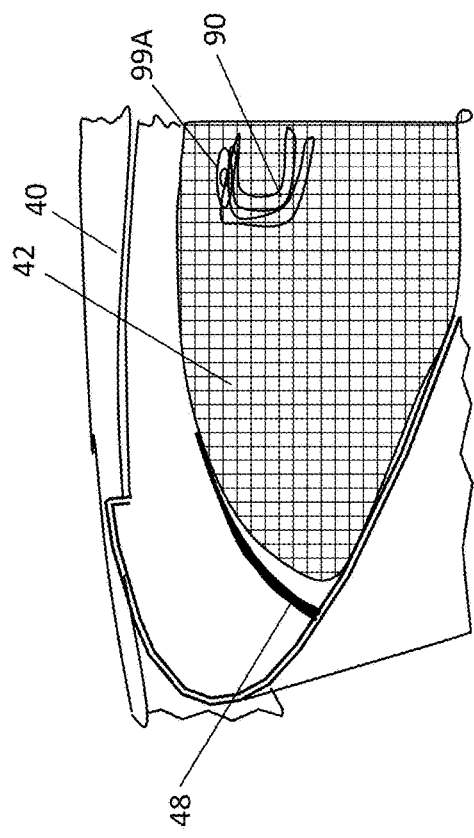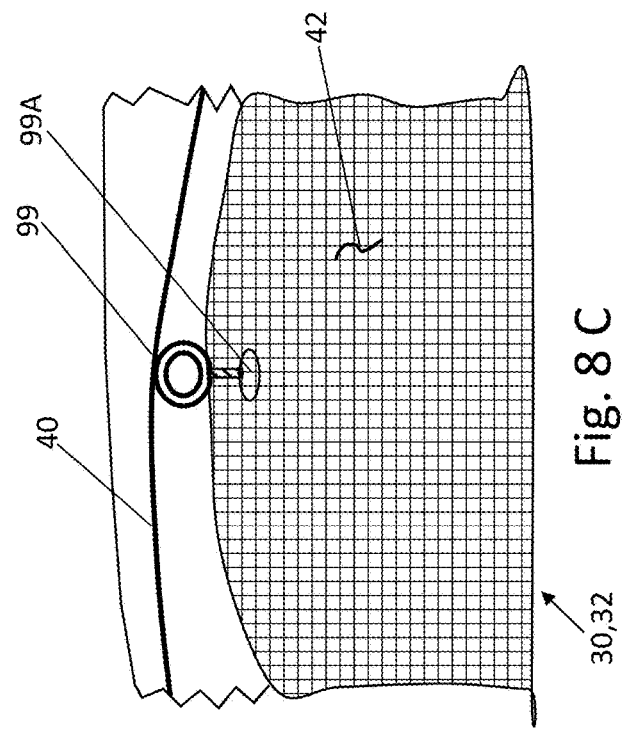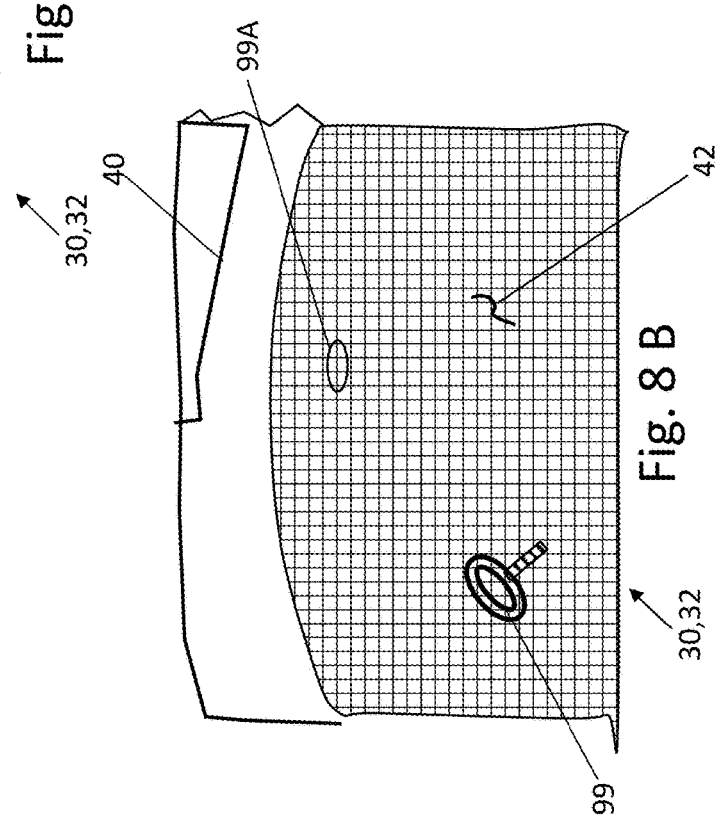

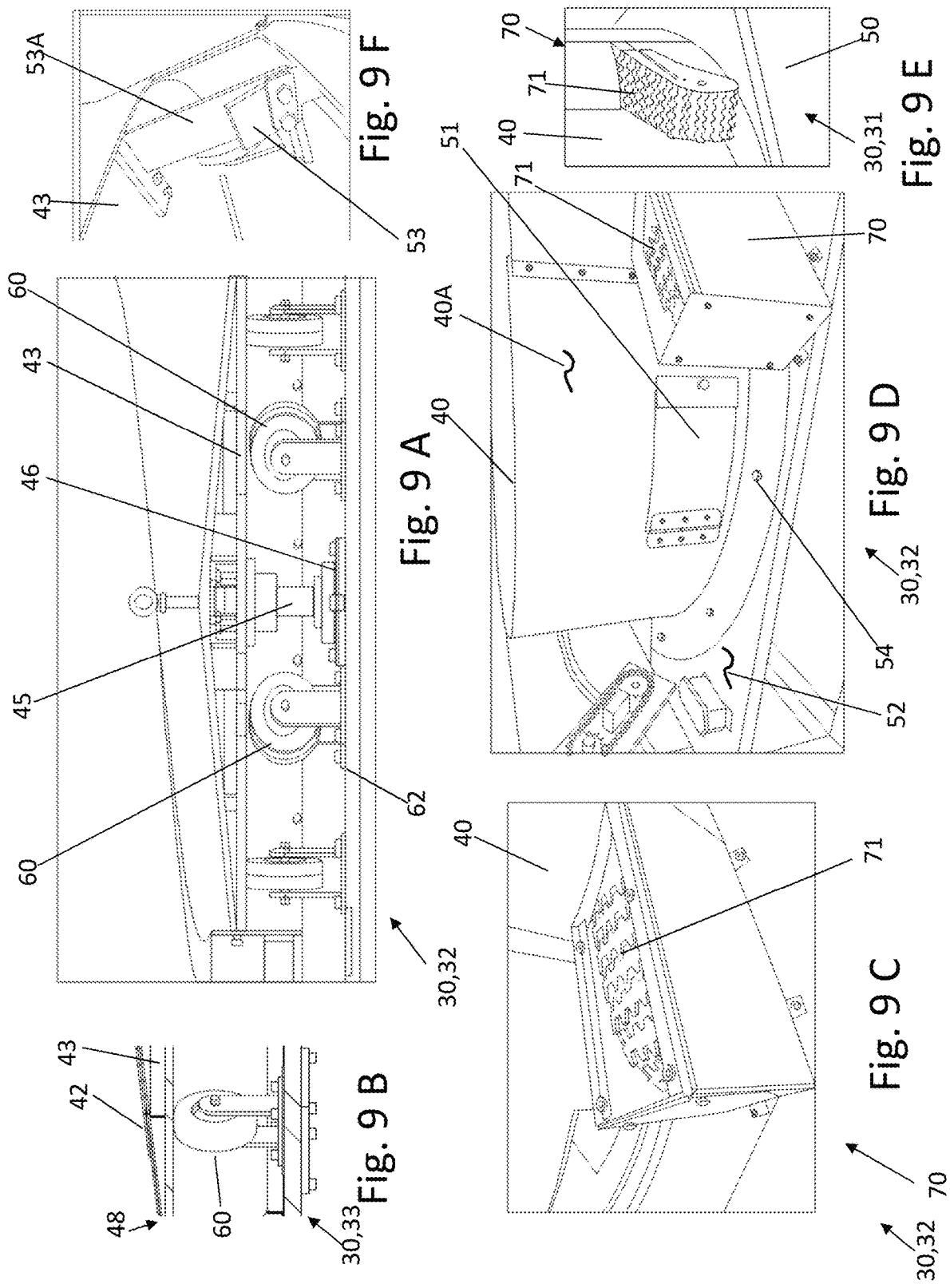

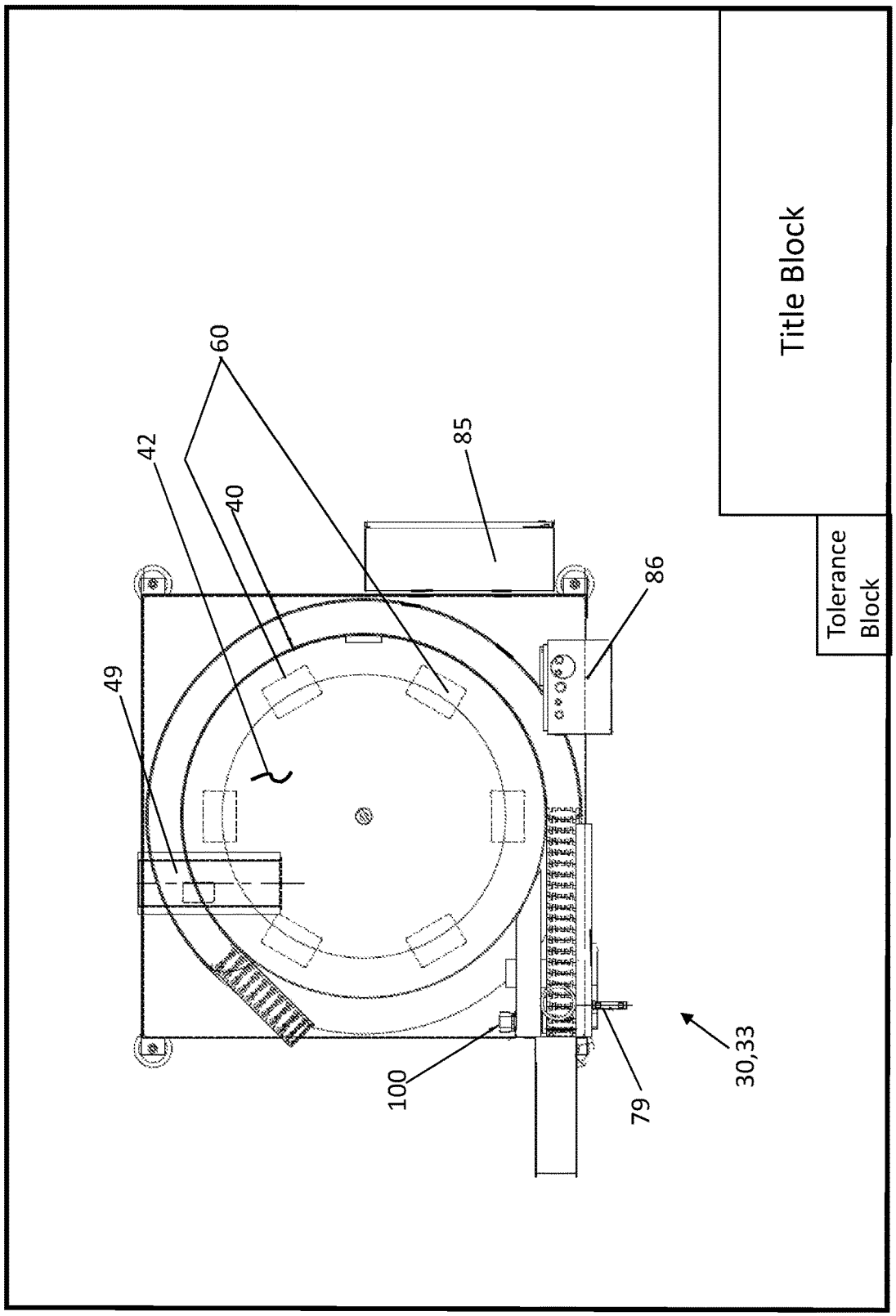

HEAVY DUTY CENTRIFUGAL FEEDER DEVICE AND SYSTEM

CROSS-REFERENCE TO RELATED APPLICATIONS

This application claims the benefit of United States Provisional Patent Application with Ser. No. 62/488,777 filed Apr. 23, 2017, by Greg Shombert and entitled "Heavy Duty Centrifugal Feeder device and system".

FIELD OF INVENTION

This invention relates to a centrifugal bowl parts feeder system for various relatively heavy part feeding (such as automotive bearings, gears, castings etc.) applications. Taught here are the ways a small, heavy part (1-6 inches in diameter and ½ to 5 pounds apiece) may be oriented and conveyed by a centrifugal parts feeder system. Particularly this system is related to feeder mechanisms that are used to orient and place parts for manufacturing operations. All this is accomplished with a machine system for orienting and aligning articles that uses a heavy duty centrifugal bowl feeder or equal type of centrifugal feeder system.

FEDERALLY SPONSORED RESEARCH

None.

SEQUENCE LISTING OR PROGRAM

None.

BACKGROUND

Field of Invention and Prior Art

As far as known, there are no Heavy Duty Centrifugal bowl parts feeder system or the like. It is believed that this product is unique in its design and technologies.

BACKGROUND

Component feeding in automated assembly machines normally involves three aspects: (i) singulation, which is the separation of multiple components so they can be manipulated individually, (ii) orientation, which is the manipulation of components into a specific orientation required for the next processing step; and (iii) escapement, which is the controlled separation and transfer of components from the end of a line and insertion into a processing machine, e.g., an assembly machine at a specific spacing between components, as required by the processing machine. Escapement can also include additional aspects of singulation and orientation. Traditionally, this has been done with vibratory feeders, mechanical tumble feeders or centrifugal bowl devices.

PROBLEM SOLVED

The improvement and problem solved is providing a heavy duty centrifugal feeder system that is durable, rugged and strong enough to orient and feed heavy parts such as automotive bearings, gears, castings etc. And to provide a heavy duty alternative and option orientation and conveyance system as opposed to large conveyors, pick and place, robot transfers and intensive labor systems

PRIOR ART

As far as known, there are no Heavy Duty Centrifugal bowl parts feeder system or the like. A diligent novelty search was completed. The following was revealed: A. U.S. Pat. No. 9,211,962 by Kerkeslager et al. was issued in 2015 and entitled Methods and Systems for Orienting Articles. It demonstrates an apparatus for orienting articles includes a bowl having a sidewall and angled relative to horizontal, a disc disposed in the bowl and rotatable relative to the bowl, the disc having a radius proximate its outer periphery defining a groove sized to receive one of the articles in a predetermined orientation, and a diverter for diverting canisters contained in the groove through an outlet in the sidewall of the bowl. B. U.S. Pat. No. 8,074,782 by Charpentier et al. was issued in 2011 and entitled a High Rate Preform Feeding Device. Portrayed and taught is a centrifugal feeder device having an outer enclosure which accommodates a ring mounted rotatably in the enclosure and lying in an approximately horizontal plane, and a disc rotatable in the ring. The axis of rotation of the disc is inclined with respect to the axis of rotation of the ring, the disc and the ring approximately tangent to each other in a transfer area and distant from each other in a loading area. The ring is surrounded by a lateral guide. The ring supplies an outlet channel whose inlet is situated above a part of useful width of the ring, the ring is provided with approximately radial notches, and the device includes a mechanism for adjusting the useable width of the ring. C. U.S. Pat. No. 7,789,215 by Snyder was issued in 2010 and entitled a Centrifugal/Vibratory Feeder System. Demonstrated is a primary and secondary housings each have a cylindrical side wall and a horizontal circular lower plate. A centrifugal assembly is formed by the secondary housing. A first motor rotates the circular plate of the secondary housing. Cleats extend upwardly from the circular plate whereby when a quantity of workpieces is placed in the secondary housing the workpieces will be projected out of the secondary housing into the primary housing by centrifugal force caused by the spinning cleats. A vibratory assembly is formed by the primary housing. A second motor reciprocates and vibrates the primary housing. A ramp is secured interiorly of the side wall of the primary housing and extends in a spiral configuration from the circular plate to the top of the side wall.

D. U.S. Pat. No. 7,740,125 by DerMarderosian et al. was issued in 2010 and called a Component Feeding with Continuous Motion Escapement. Taught is the invention that relates to methods and systems for transferring a stream of a components, either as individual components or as a continuous strip or band from which individual components are cut, from a component feeder to a component receiver, e.g., in a processing machine, with controlled, e.g., continuous, motion escapement of the individual components from the feeder. E. U.S. Pat. No. 7,472,782 by Corbin was issued in 2009 and entitled a Rotary Feeder. This teaches a rotary feeder for transferring articles includes a support frame, a rotatably driven bowl assembly mounted on the support frame and including a bowl mounted for rotation about a bowl axis, and a rotatably driven shaft mounted on the support frame for rotation about a shaft axis. A coupling is rotatably driven by the shaft and has a first end coupled to the shaft and a second end, the second end being pivotable with respect to the first end to define a tilt axis oriented at an angle with respect to the bowl axis. An adjustable guide assembly is mounted on the support frame and adapted to secure the coupling second end along a selected tilt axis. A disc is coupled to the coupling second end and rotates about the tilt axis, the disc including a lower portion and an upper portion, the upper portion defining an article transfer point. F. U.S. Pat. No. 6,578,699 by Baird et al. was issued in 2003 an entitled a Rotary Orienting Feeder. Provided is a rotary orienting feeder is configured for singulating/orienting bulk volumes of articles. The feeder includes a rotatably driven feed disc, and a rotatably driven orienting bowl assembly which is positioned generally about the feed disc. The feed disc is driven about an axis which angularly intersects an axis about which the bowl is driven, whereby during operation articles are transferred from the feed disc to an upper flange portion of the bowl assembly. An outer guide fence, which may be provided with suitable tooling, cooperates with the bowl and the articles carried thereby to effect singulation/orientation. Economical and versatile manufacture and operation are achieved by forming an outer bowl of the orienting bowl assembly of non-metallic material, such as polymeric resin. Reduced weight, reduced power consumption, quieter operation, and gentler part handling are desirably achieved. G. U.S. Pat. No. 5,954,185 by Eshelman et al. was issued in 1999 and called a Centrifugal Feeder. This shows a centrifugal feeder for rectangular items with one of its upper or lower surfaces having luminescent characteristics which are greater than the other surface. It is desired to orient the items with its elongated axis in the direction of the output and its luminescent surface downward. The feeder has a rotating bowl surrounded by a rotating rim. Items are placed on the rotating bowl by any suitable device. A sweep pushes the items randomly onto the rim and a pair of sweeps then insure that the items are flat and only one layer high. The rim then narrows so that items not disposed with their elongated axis tangentially will over balance and fall off the rim. A sensor then determines the space between items, and if the space exceeds a preselected interval, signals for more items to be placed onto the bowl. A luminescence sensor then determines if the item thereunder is disposed with its greater luminescent surface up and a kick off device kicks off items with the greater luminescent side up. As the items fall off the rim a turn over device places the items on the bowl with the desired surface up and the items then go through the selection process again along with the newly deposited items.

H. U.S. Pat. No. 5,853,077 issued to Schmitt in 1998 was called an Article Handling Device Combination and Methods Schmitt. Taught is a rotary puck conveying mechanism and method will qualify articles and place them within a puck or article handling device. This puck has a centrally disposed opening for receiving the articles. The mechanism includes a centrifugal feeder with a rotatable rim having a plurality of openings. Pucks are positioned beneath the openings in order to receive the articles. The pucks will be fed to the centrifugal feeder and aligned with the openings in the rim. The pucks will simultaneously move with these aligned openings beneath the rim. When the articles remaining on the rim are swept off of this rim, the pucks or at least a piece of the pucks can then be detached and conveyed away from the centrifugal feeder. The pucks are designed to maintain orientation of an article held therein even when the pucks are inverted. The pucks can also have a movable insert for exposing and orienting articles held therein. I. U.S. Pat. No. 5,419,442 by Wright, Jr. was issued in 1995 and entitled a Seperating Device for Discriminating between Defective and Non-defective Articles. Demonstrated and taught is the separation device includes a container having a dome-shaped base and a peripheral wall surrounding the base to define a chamber for receiving a random mixture of defective and nondefective articles. A spiral-shaped ramp on the peripheral wall which surrounds the chamber and overhangs the base, leads to an elevated outlet opening. A vibrating device vibrates the chamber to excite movement of the defective and nondefective articles along the base and onto and up the ramp toward the outlet opening. The container also includes trap openings in the base and ramp to eliminate defective articles from the chamber. Discriminating devices are provided on the ramp that cause defective material to fall from the ramp back onto the base of the chamber. Only the nondefective articles can move on the ramp past the trapping devices toward the outlet of the container for transfer to another processing station. J. U.S. Pat. No. 4,884,678 was issued to Graham et al. in 1989 and named an Orbital Cap Selecting And Feeding Mechanism. This is an orbital cap selection and feeding device is disclosed having a disk rotating within a circular frame so that caps disposed on the disk tend to move by centrifugal force to the perimeter of the disk. The frame includes structure defining a guide chute to retain a procession of caps lying flat within the guide chute and to keep caps at the interior of the rotating disk out of the chute. The guide chute carries the procession of caps about 180 degrees to a discharge chute. About midway along the length of the guide chute is an optical sensor that uses a reflected beam of light to sense the orientation of caps in the procession and generate an electrical signal when an improperly oriented cap is encountered. The signal is received by an ejection airjet downstream of the optical sensor which is actuated in response to the signal to displace the improperly oriented cap from the guide chute and back into the interior of the rotating disk. Properly oriented caps in the procession continue along the guide chute, up a ramp situated flush with the rotating disk and into a stationary discharge chute. A second optical sensor may be added to the discharge chute to sense when the chute is full to continuously activate the ejection airjet.

K. U.S. Pat. No. 4,830,172 was issued to Hilton et al. in 1989 and titled a Rotary Feeder. This teaches a rotary article feeder has a bowl having a substantial conical base section joining an upwardly extending and outwardly displaced sidewall section. Articles to be handled contact the outer wall and are assisted in transport out of the bowl through contact with the ever increasing circumference of the bowl sidewall as the articles move upwardly on an inclined stationary ramp to a transport surface for distribution through various fence and wiper accessories. L. U.S. Pat. No. 4,493,459 was issued to Burkett in 1985 and named a Multi-Purpose Centrifugal Mill. Demonstrated and shown in this patent is a multi-purpose heavy duty centrifugal mill including a vertically disposed housing to which various frangible materials are fed tangentially to a pre-grinder located in the bore of the housing with the pre-grinder adapted to grind the materials to a predetermined size and direct them to comminution devices for further gradation sizing. The housing is open at the top to freely admit air for aeration of putricidable materials and through which a liquid carrier medium may be introduced. M. U.S. Pat. No. 4,444, 303 by Burgess et al. was issued in 1984 and called a Vibratory Feeding Work Station Module and System. Portrayed is a work station module which includes a buffer storage area for the transitory storage of workpiece carriers which are received at non-specific intervals and an escapement station to facilitate performance of some operation of a workpiece carried by each carrier. The buffer storage area includes a conveying surface which is defined by a plurality of fibers and which is vibrated to move the carriers longitudinally therealong. The resiliency of the fibers permits carriers which are adjacent the escapement station to remain stationary even though the conveying surface is vibrating. At the escapement station, the workpieces are coarsely positioned, lifted from the conveying surface, and accurately positioned and oriented to facilitate performance of the operation. Following the operation, the carrier is returned to the vibrating conveying surface for conveying to the buffer storage area of the next module.

N. U.S. Pat. No. 4,272,366 by Dean et al. was issued in 1981 and entitled a Heavy Duty Two Mass Vibratory Machine. In this patent is a two-mass heavy duty vibratory machine has a frame in the form of a box-like cage in which a working member, such as a screen, is received. In one embodiment of the disclosure, the frame is resiliently mounted on a stationary support surface and the working member is resiliently suspended from the frame. In another embodiment of the disclosure, the working member is resiliently mounted on the stationary support surface and the frame is suspended from the working member. In both embodiments, an exciter is mounted on the frame at a location outside the frame and spaced from the working member. O. U.S. Pat. No. 3,912,120 issued to Hoppmann et al in 1975 and was entitled a Centrifugal Method of Sorting and Orienting Particulate Articles. Shown here is a high speed feeding, counting, orienting and storing of parts, for example ammunition, candy, machine screws, nuts, pharmaceutical and cosmetic containers and the like. The articles are randomly discharged upon a rotating radially aligned channel, a vertical restraint is imposed upon the articles within the channel, so as to align the articles with respect to the channel. The articles are dropped while rotating, such that the desired orientation is achieved within and prior to discharge from the channel. The method is distinguished from the prior art in that the orientation occurs as the parts are distributed circumferentially and radially, that is the parts are arranged in a plurality of moving single file lines. The prior art techniques involve the single depositing of an article at the periphery of a rotating rim, there being no suggestion of separating or orienting a plurality of articles within each of a plurality of radially extending channels. P. U.S. Pat. No. 3,658,207 by Schultz was issued in 1972 and named a Centrifugal Feeder for Headed Parts. It provides a centrifugal feeder is shown in which parallel rails are employed in a pick-off in combination with a plow having a cuvilinear pick-up point and a straight edge delivery to the parallel rails. The parallel rails deliver headed parts which are fed by the centrifugal feeder to a track for repositioning in various assembly units.

SUMMARY OF THE INVENTION

This invention is a Heavy Duty Centrifugal Feeder device and system for various relatively heavy part feeding (such as automotive bearings, gears, castings etc.) applications. Taught here are the ways a small, heavy part (1-6 inches in diameter and ½ to 5 pounds apiece) may be oriented and conveyed by a centrifugal parts feeder system.

The preferred embodiment of a heavy duty centrifugal bowl parts feeder system comprised of: a). a feeder bowl system having a bowl, an electrical drive assembly and a shaft connected to an inner disk and further comprising a set of selection tooling and discharge tooling affixed to the top of the bowl; b). a support structure contiguous and beneath the feeder bowl, the support structure having a top surface; c). a means for securing the feeder bowl to the support structure; d). an input parts conveyor and an output parts conveyor; and e). a heavy duty support package comprised of: 1) an approximately ⅜" thick inner disc base plate for maximum rigidity; 2) a dimpled stainless steel "cone" cap over inner disc to reduce surface contact; 3) a plurality of heavy duty casters mounted under the inner disc to support the weight and to tighten flatness tolerance of the disc wherein the casters are mounted from underneath which allows for easy maintenance; 4) the inner disc is inset slightly leaving an aperture/crack to allow oil on parts to disperse in the aperture/crack; 5) a wiper mounted to bottom of the disc which cleans the disk by pushing oil into a hole in a base plate and into a collection tray; 6) a variable speed control on the drive of the of the inner disc controlled by a photo eye; and 7) an angle chute with an adjustable discharge angle wherein the heavy duty centrifugal bowl parts feeder system can feed and orient relatively heavy parts, being small, heavy part (1-6 inches in diameter and ½ to 5 pounds apiece) may be oriented and conveyed by a centrifugal parts feeder system.

The newly invented Heavy Duty Centrifugal Feeder device and system for various relatively heavy part feeding applications may be manufactured in both low volume and high volume production.

Objects and Advantages

There are several objects and advantages of the Heavy Duty Centrifugal Feeder (HDCF) device and system. There are currently no HDCF device and system that are effective at providing the objects of this invention.

The HDCF has various advantages and benefits:

| Item | Advantages |
|---|---|
| 1 | Provides heavy duty option orientation and conveyance system as opposed to large conveyors, pick and place, robot transfers and intensive labor systems |
| 2 | Uses dimpled surface cone cap to enhance part movement and protect parts |
| 3 | Has easy access to castor supports for maintenance |
| 4 | Provides oil removal from parts and feeder bowl |
| 5 | Runs quiet compared to alternative systems |
| 6 | Accepts modular selection tools and discharge tools for fast changeover of production parts being fed |
| 7 | Provides flexible discharge chute |
| 8 | Provides other advantages of centrifugal feed systems |

Finally, other advantages and additional features of the present HDCF device and system will be more apparent from the accompanying drawings and from the full description of the device. For one skilled in the art of parts feeding and orientation devices and systems, it is readily understood that the features shown in the examples with this product are readily adapted to other types of centrifugal and feeder systems and devices.

BRIEF DESCRIPTION OF THE DRAWINGS

The accompanying drawings, which are incorporated in and constitute a part of this specification, illustrate an embodiment of the Heavy Duty Centrifugal Feeder device and system that is preferred. The drawings together with the summary description given above and a detailed description given below serve to explain the principles of the HDCF device and system. It is understood, however, that the HDCF device and system is not limited to only the precise arrangements and instrumentalities shown.

FIGS. 1A through 1D are sketches of the general Heavy Duty Centrifugal Feeder device and system for part orientation and transfer applications.

FIGS. 6A through 6C are sketches of the HDCF device and system as section views of the top, side and end with components and features noted.

FIGS. 8A through 8C are sketches of the top area of the HDCF device and system.

FIGS. 9A through 9F are sketches of the support castors and depictions of the general parts infeed conveyor for the HDCF device and wiper and system.

FIGS. 12, 13, and 14 are manufacturing tool and production assembly drawings for the HDCF device and system.

DESCRIPTION OF THE DRAWINGS—REFERENCE NUMERALS

Figure 2:
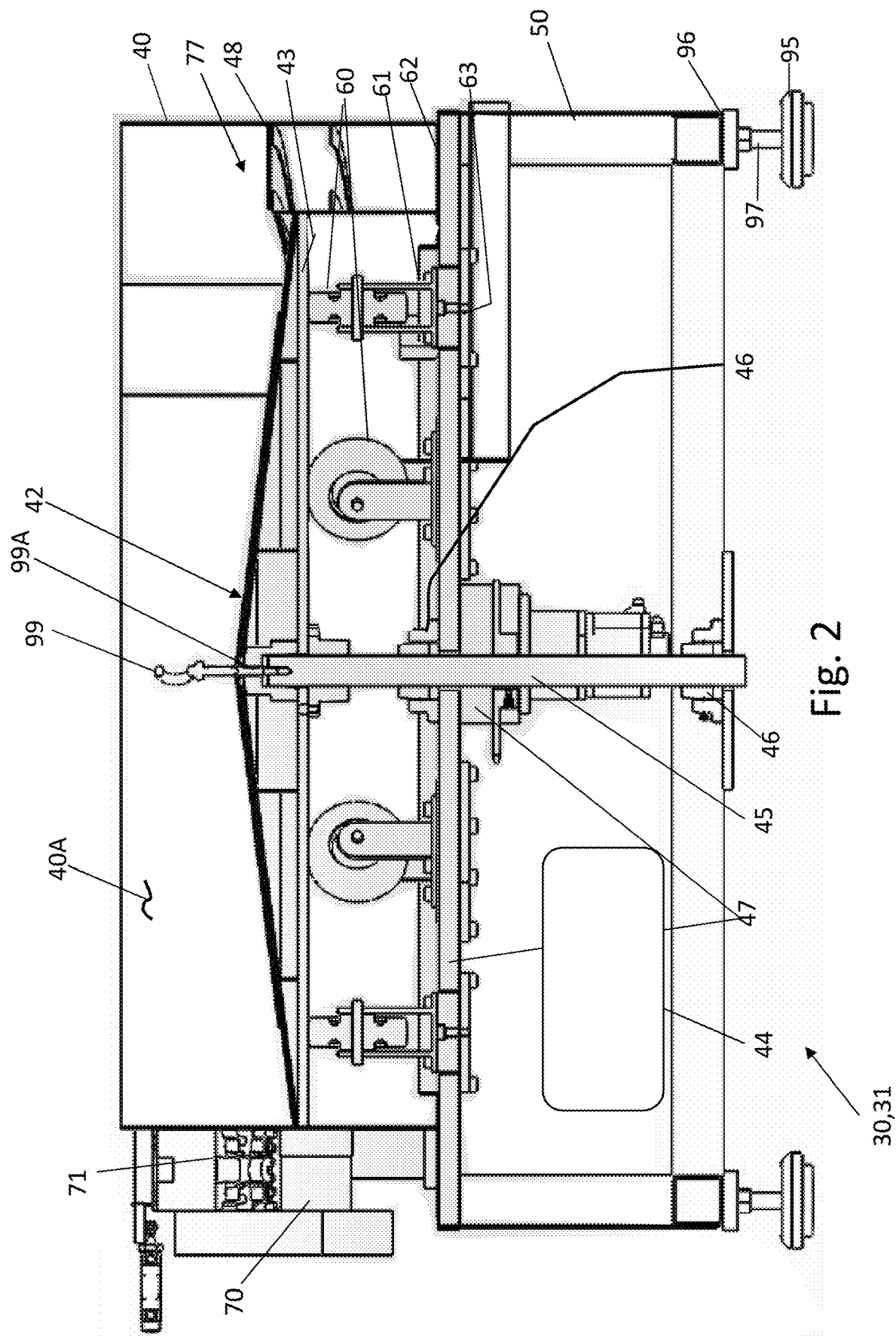
FIG. 2 is a sketch of the general Heavy Duty Centrifugal Feeder (HDCF) device and system from a generally side view with components and features noted.

The following list refers to the drawings:

TABLE B: REFERENCE NUMBERS

| Ref # | Description |
| --- | --- |
| 30 | the general Heavy Duty Centrifugal Feeder (HDCF) device and system 30 |
| 31 | solid drawings 31 the general Heavy Duty Centrifugal Feeder (HDCF) device and system 30 |
| 32 | prototype 32 the general Heavy Duty Centrifugal Feeder (HDCF) device and system 30 |
| 33 | design drawings 33 the general Heavy Duty Centrifugal Feeder (HDCF) device and system 30 |
| 40 | Heavy Duty Centrifugal Feeder (HDCF) bowl 40 |
| 40A | exterior surface 40A of Feeder (HDCF) bowl 40 |
| 41 | speed sensor 41 |
| 42 | dimpled stainless steel or equal durable material cone cap 42 |
| 43 | rigid inner disk base plate 43 |
| 44 | electrical drive motor and gear box 44 to rotationally turn/spin the centrifugal base plate 43 |
| 45 | HDCF vertical drive shaft 45 |
| 46 | at least two bearings 46 for rotationally securing drive shaft 45 to HDCF support structure |
| 47 | drive system - chain/belts between drive and driven sprockets/pulleys between drive 44 and shaft 45 |
| 48 | aperture 48 at perimeter of rigid inner disk base plate 43 which permits oil from parts 90 to drain and divert to oil cleanout tray 49 |

-continued

| Ref # | Description |
| --- | --- |
| 49 | oil cleanout tray 49 |
| 50 | HDCF support structure and enclosure 50 |
| 51 | access door 51 on surface 40A of feeder device for maintenance and component replacement |
| 52 | surface 52 of support 50 |
| 53 | wiper 53 to clean oil and divert oil from the bottom of the rigid inner disk base plate 43 to oil cleanout tray 49 |
| 53A | support 53A for wiper 53 connected to disk plate 43 |
| 54 | mounting fasteners 54 of bowl 40 to top surface of support 52 |
| 60 | HDCF support castors 60 (a plurality, preferred 6) |
| 61 | means for securing 61 castors 60 to support plate 62 |
| 62 | support base plate 62 |
| 63 | clamping plate 63 for castors 60 |
| 70 | parts infeed conveyor 70 with random parts 90 |
| 71 | flexible chain/belt 71 for infeed conveyer 70 |
| 77 | parts output/exit or off-feed conveyor 77 with oriented parts 90 |
| 78 | flexible chain/belt 78 for output conveyer 77 |
| 79 | photo sensor 79 on exit conveyor 77 |
| 80 | adjustable (vertically and laterally) exit chute 80 |
| 81 | drive system 81 for exit conveyor 77 |
| 85 | electrical power and control panel 85 |
| 86 | HDCF operator control box 86 |
| 90 | parts 90 being oriented and fed through Heavy Duty Centrifugal Feeder (HDCF) |
| 93 | selection tooling (orientation and quantity) and zone 93 |
| 94 | discharge tooling (size and orientation) and zone 94 |
| 95 | HDCF leveling pads/feet 95 |
| 96 | support plate 96 for pads/feet 95 |
| 97 | adjustment fasteners 97 |
| 99 | removable pick-up eyebolt 99 |
| 99A | threaded aperture 99A - in the end of the main shaft 45 - for the eyebolt 99 |
| 100 | high level sensor 100 - stops bowl 40 and allows exit conveyor 77 to empty |

DETAILED DESCRIPTION OF PREFERRED EMBODIMENT

This invention relates to a centrifugal bowl parts feeder system for various relatively heavy part feeding (such as automotive bearings, gears, castings etc.) applications. Taught here are the ways a small, heavy part (1-6 inches in diameter and ½ to 5 pounds apiece) may be oriented and conveyed by a centrifugal parts feeder system. Particularly this system is related to feeder mechanisms that are used to orient and place parts for manufacturing operations. All this is accomplished with a machine system for orienting and aligning articles that uses a heavy duty centrifugal bowl feeder or equal type of centrifugal feeder system.

The advantages for the Heavy Duty Centrifugal Feeder device and system 30 are listed above in the introduction. Succinctly the benefits are that the device:

1. Provides heavy duty option orientation and conveyance system as opposed to large conveyors, pick and place, robot transfers and intensive labor systems.
2. Uses dimpled surface cone cap to enhance part movement and protect parts.
3. Has easy access to castor supports for maintenance.
4. Provides oil removal from parts and feeder bowl.
5. Runs quiet compared to alternative systems.
6. Accepts modular selection tools and discharge tools for fast changeover of production parts being fed.
7. Provides flexible discharge chute.
8. Provides other advantages of centrifugal feed systems.
9. The centrifugal feeders produce high feed rates which increases productivity.

10. The rotary feeders allow for the gentle handling of parts and virtually ensures that product does not get damaged.
11. Even the most complicated part can be oriented and sorted out efficiently by the centrifugal feeders.
12. There is gentle and smooth functioning of centrifugal feeders require less maintenance and quieter operation.
13. There is lower part recirculation, flexible feed ranges, and improved product changeover times are some of the other noteworthy features of our centrifugal feeders.
14. There is adjustable tooling to feed multiple parts in the same system with positive adjustment features that insure repeatability.

The preferred embodiment of a heavy duty centrifugal bowl parts feeder system comprised of: a). a feeder bowl system having a bowl, an electrical drive assembly and a shaft connected to an inner disk and further comprising a set of selection tooling and discharge tooling affixed to the top of the bowl; b). a support structure contiguous and beneath the feeder bowl, the support structure having a top surface; c). a means for securing the feeder bowl to the support structure; d). an input parts conveyor and an output parts conveyor; and e). a heavy duty support package comprised of: 1) an approximately ⅜" thick inner disc base plate for maximum rigidity; 2) a dimpled stainless steel "cone" cap over inner disc to reduce surface contact; 3) a plurality of heavy duty casters mounted under the inner disc to support the weight and to tighten flatness tolerance of the disc wherein the casters are mounted from underneath which allows for easy maintenance; 4) the inner disc is inset slightly leaving an aperture/crack to allow oil on parts to disperse in the aperture/crack; 5) a wiper mounted to bottom of the disc which cleans the disk by pushing oil into a hole in a base plate and into a collection tray; 6) a variable speed control on the drive of the of the inner disc controlled by a photo eye; and 7) an angle chute with an adjustable discharge angle wherein the heavy duty centrifugal bowl parts feeder system can feed and orient relatively heavy parts, being small, heavy part (1-6 inches in diameter and ½ to 5 pounds apiece) may be oriented and conveyed by a centrifugal parts feeder system.

There is shown in FIGS. 1-14 a complete description and operative embodiment of the Heavy Duty Centrifugal Feeder device and system. In the drawings and illustrations, one notes well that the FIGS. 1-14 demonstrate the general configuration and use of this product. The various example uses are in the operation and use section, below.

The accompanying drawings, which are incorporated in and constitute a part of this specification, illustrate an embodiment of the HDCF device and system 30 that is preferred. The drawings together with the summary description given above and a detailed description given below serve to explain the principles of the HDCF device and system 30. It is understood, however, that the HDCF device and system 30 is not limited to only the precise arrangements and instrumentalities shown. Other examples of system and devices and uses are still understood by one skilled in the art of parts feeding and orientation devices and systems to be readily adapted to other types of centrifugal and feeder systems and devices and to be within the scope and spirit shown here.

FIGS. 1A through 1D are sketches of the general Heavy Duty Centrifugal Feeder device and system 30, 31, 33 for part orientation and transfer applications. Sown here are: the general Heavy Duty Centrifugal Feeder (HDCF) device and system 30; solid drawings 31 the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; parts infeed conveyor 70 with random parts 90; electrical power and control panel 85; HDCF operator control box 86; and HDCF leveling pads/feet 95.

FIG. 2 is a sketch of the general Heavy Duty Centrifugal Feeder (HDCF) device and system 30, 31 from a generally side view with components and features noted. Several components and features shown in this sketch includes: the general Heavy Duty Centrifugal Feeder (HDCF) device and system 30; solid drawings 31 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; rigid inner disk base plate 43; electrical drive motor and gear box 44 to rotationally turn/spin the centrifugal base plate 43; HDCF vertical drive shaft 45; at least two bearings 46 for rotationally securing drive shaft 45 to HDCF support structure; drive system 47—chain/belts between drive and driven sprockets/pulleys between drive 44 and shaft 45; aperture 48 at perimeter of rigid inner disk base plate 43 which permits oil from parts 90 to drain and divert to oil cleanout tray 49; oil cleanout tray 49; HDCF support structure and enclosure 50; HDCF support castors 60 (a plurality, preferred six but at least three, four or five); means for securing 61 castors 60 to support plate 62; support base plate 62; clamping plate 63 for castors 60; parts infeed conveyor 70 with random parts 90; flexible chain/belt 71 for infeed conveyer 70; and parts output/exit or off-feed conveyor 77 with oriented parts 90. Other durable and high impact materials for the cone 42 in addition to the dimpled stainless steel include high density polyethylene (HDPE), High Impact Polystyrene, reinforced nylon, reinforced urethane, steel alloys, and high impact composite materials.

Figure 3:
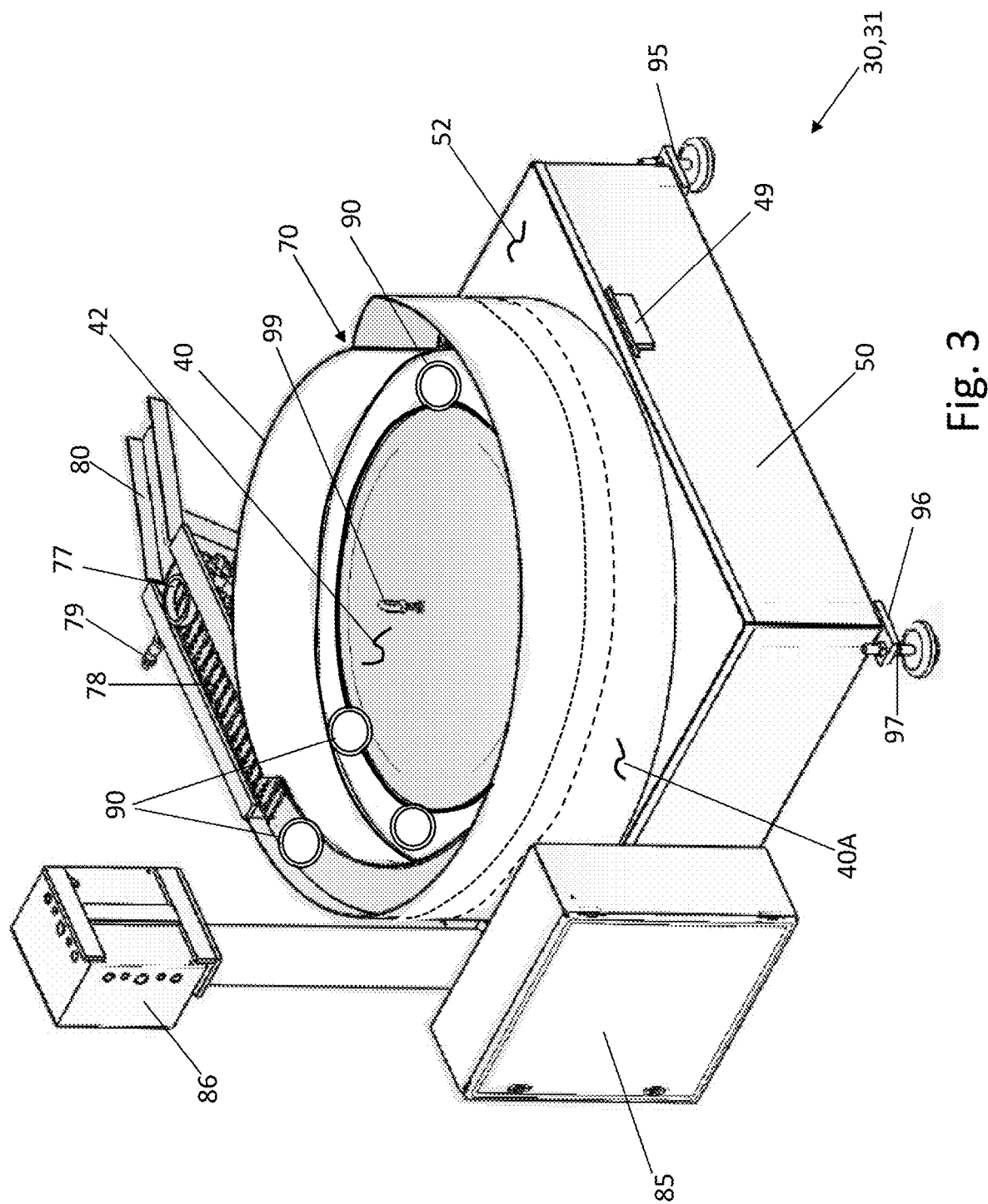
FIG. 3 is a sketch of the general Heavy Duty Centrifugal Feeder (HDCF) device and system from a generally rear isometric view with components and features noted.

FIG. 3 is a sketch of the general Heavy Duty Centrifugal Feeder (HDCF) device and system 30, 31 from a generally rear isometric view with components and features noted. Components demonstrated here are: the general Heavy Duty Centrifugal Feeder (HDCF) device and system 30; solid drawings 31 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; oil cleanout tray 49; HDCF support structure and enclosure 50; surface 52 of support 50; parts infeed conveyor 70 with random parts 90; parts output/exit or off-feed conveyor 77 with oriented parts 90; flexible chain/belt 78 for output conveyer 77; photo sensor 79 on exit conveyor 77; adjustable (vertically and laterally) exit chute 80; electrical power and control panel 85; HDCF operator control box 86; parts 90 being oriented and fed through Heavy Duty Centrifugal Feeder (HDCF); HDCF leveling pads/feet 95; support plate 96 for pads/feet 95; adjustment fasteners 97; and removable pick-up eyebolt 99.

Figure 4:
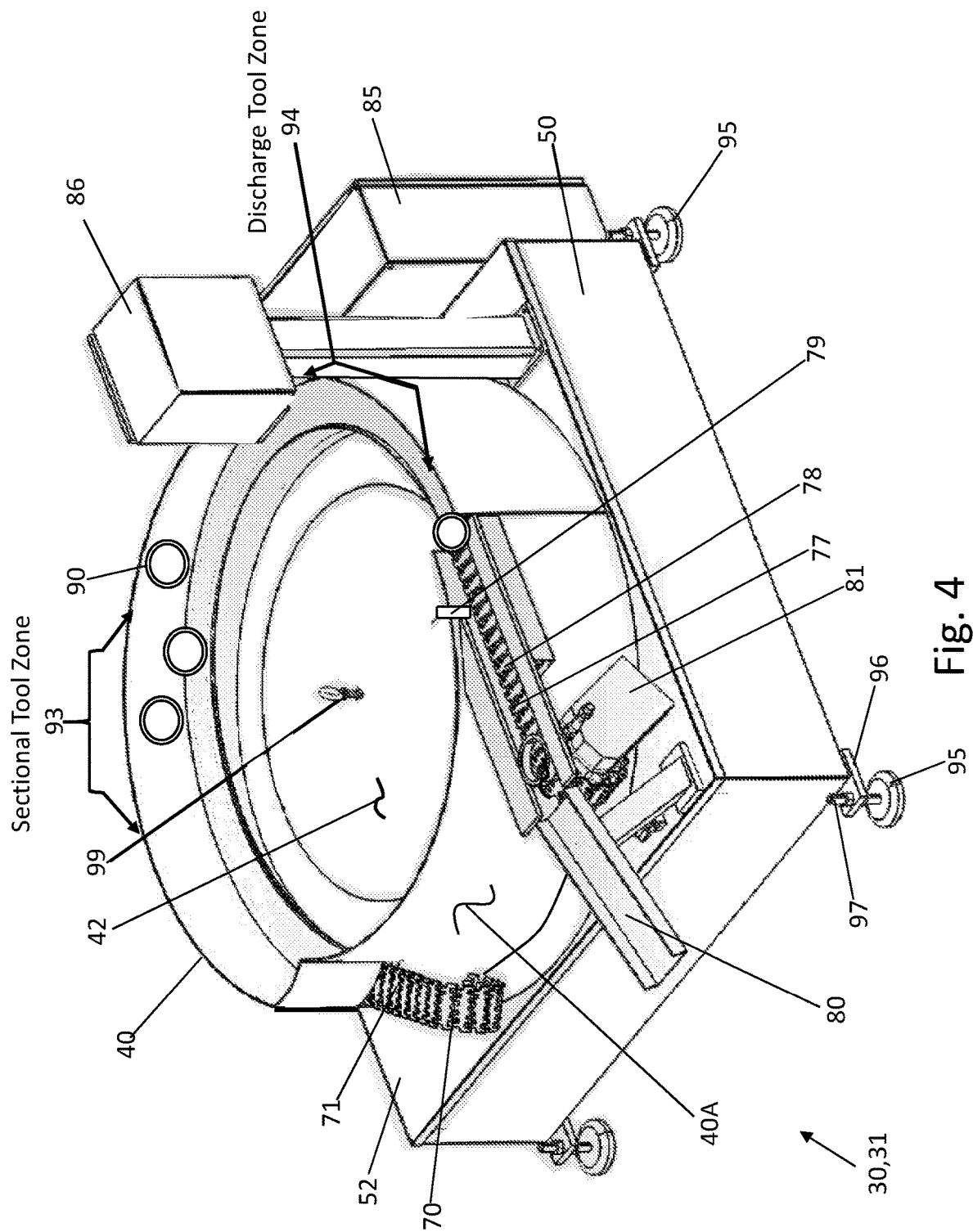
FIG. 4 is a sketch of the general HDCF device and system from a front and feeding end as a general isometric view with components and features noted.

FIG. 4 is a sketch of the general HDCF device and system 30, 31 from a front and feeding end as a general isometric view with components and features noted. This sketch provides additional components from a different angle including: the general Heavy Duty Centrifugal Feeder (HDCF) device and system 30; solid drawings 31 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; HDCF support structure and enclosure 50; surface 52 of support 50; parts infeed conveyor 70 with random parts 90; flexible chain/belt 71 for infeed conveyor 70; parts output/exit or off-feed conveyor 77 with oriented parts 90; flexible chain/belt 78 for output conveyer 77; photo sensor 79 on exit conveyor 77; adjustable (vertically and laterally) exit chute 80; drive system 81 for exit conveyor 77; electrical power and control panel 85; HDCF operator control box 86; parts 90 being oriented and fed through Heavy Duty Centrifugal Feeder (HDCF); HDCF leveling pads/feet 95; support plate 96 for pads/feet 95; adjustment fasteners 97; and removable pick-up eyebolt 99.

Figure 5:
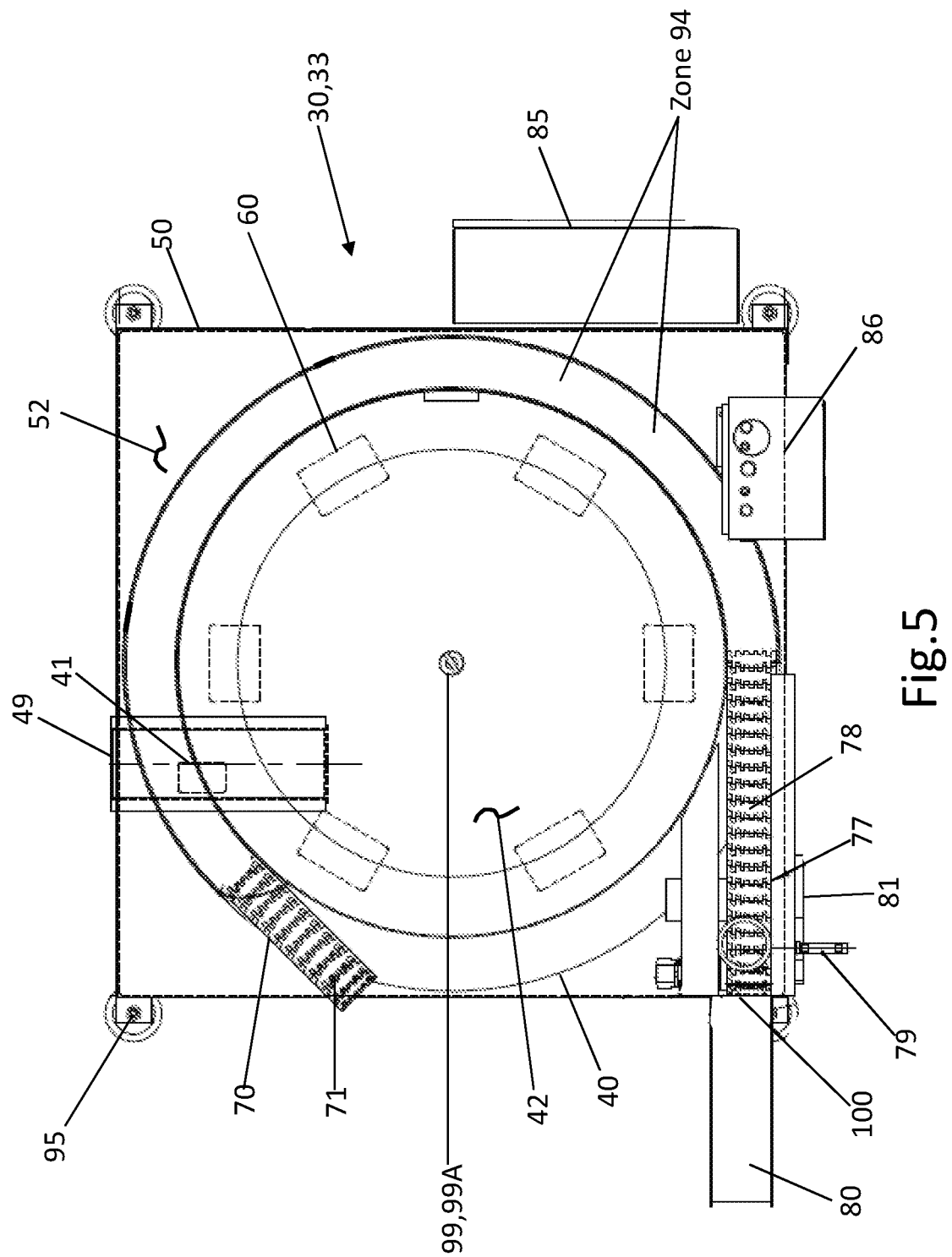
FIG. 5 is a sketch of the general HDCF device and system from a top view with components and features noted.

FIG. 5 is a sketch of the general HDCF device and system 30, 33 from a top view with components and features noted. This design drawing features: the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; speed sensor 41; oil cleanout tray 49; HDCF support structure and enclosure 50; surface 52 of support 50; HDCF support castors 60 (a plurality, preferred six but at least three, or four, or five); parts infeed conveyor 70 with random parts 90; flexible chain/belt 71 for infeed conveyer 70; parts output/exit or off-feed conveyor 77 with oriented parts 90; flexible chain/belt 78 for output conveyer 77; photo sensor 79 on exit conveyor 77; adjustable (vertically and laterally) exit chute 80; drive system 81 for exit conveyor 77; electrical power and control panel 85; HDCF operator control box 86; selection tooling (orientation and quantity) and zone 93; discharge tooling (size and orientation) and zone 94; HDCF leveling pads/feet 95; removable pick-up eyebolt 99; threaded aperture 99A—in the end of the main shaft 45—for the eyebolt 99; and high level sensor 100—stops bowl 40 and allows exit conveyor 77 to empty.

FIGS. 6 A through 6 C are sketches of the HDCF device and system 30, 33 as section views of the top, side and end with components and features noted. These cut-away sections show: the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; HDCF vertical drive shaft 45; HDCF support structure and enclosure 50; HDCF support castors 60; parts infeed conveyor 70 with random parts 90; parts output/exit or off-feed conveyor 77; flexible chain/belt 78 for output conveyer 77; photo sensor 79 on exit conveyor 77; adjustable (vertically and laterally) exit chute 80; electrical power and control panel 85; HDCF operator control box 86; and HDCF leveling pads/feet 95.

Figure 7:
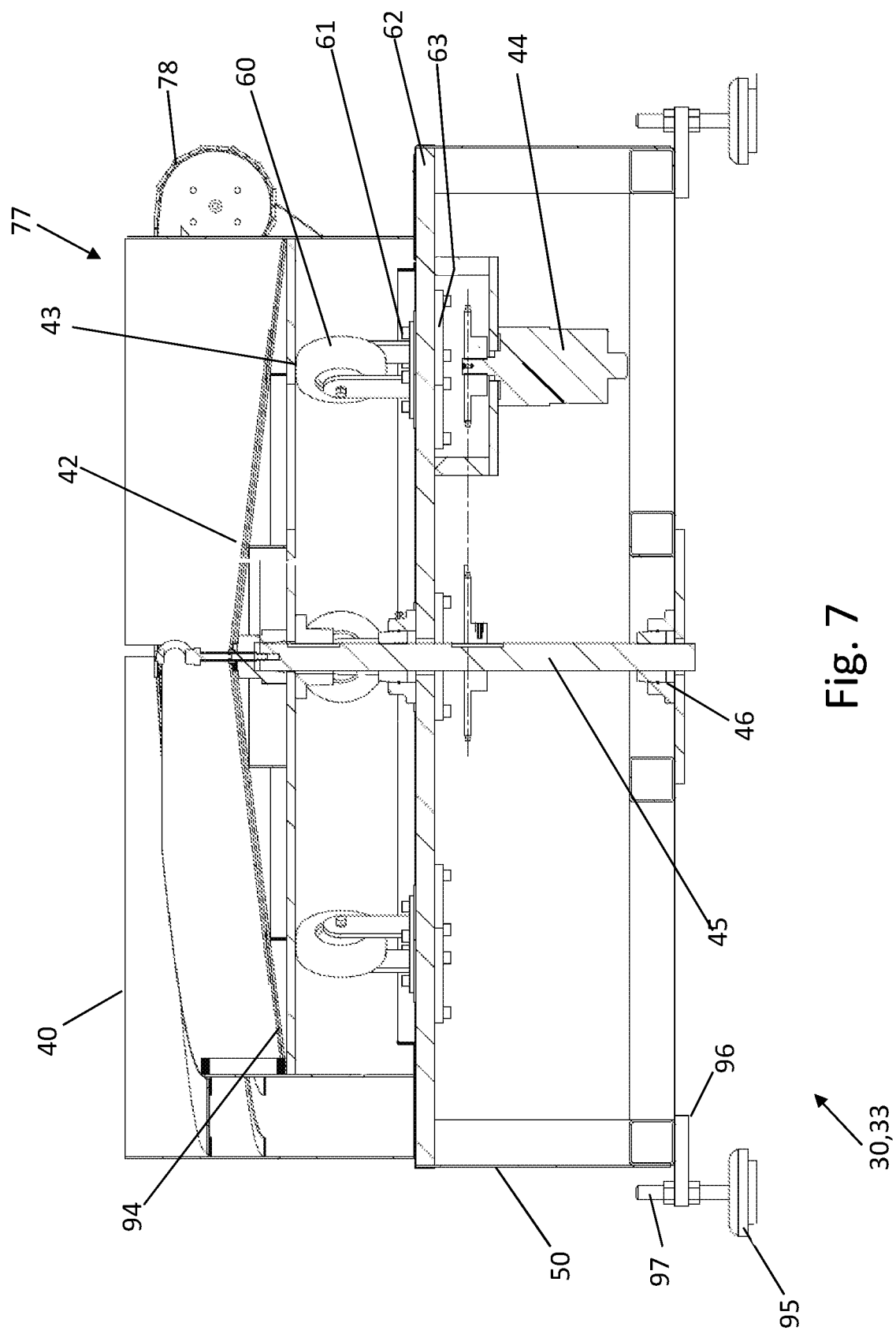
FIG. 7 is a side section view of the HDCF device and system with components and features noted.

FIG. 7 is a side section view of the HDCF device and system 30, 33 with components and features noted. Here are depicted: the general Heavy Duty Centrifugal Feeder (HDCF) device and system 30; solid drawings 31 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; rigid inner disk base plate 43; electrical drive motor and gear box 44 to rotationally turn/spin the centrifugal base plate 43; HDCF vertical drive shaft 45; at least two bearings 46 for rotationally securing drive shaft 45 to HDCF support structure; drive system 47—chain/belts between drive and driven sprockets/pulleys between drive 44 and shaft 45; aperture 48 at perimeter of rigid inner disk base plate 43 which permits oil from parts 90 to drain and divert to oil cleanout tray 49; oil cleanout tray 49; HDCF support structure and enclosure 50; HDCF support castors 60 (a plurality, preferred 6); means for securing 61 castors 60 to support plate 62; support base plate 62; clamping plate 63 for castors 60; parts infeed conveyor 70 with random parts 90; flexible chain/belt 71 for infeed conveyer 70; and parts output/exit or off-feed conveyor 77 with oriented parts 90.

FIGS. 8 A through 8 C are sketches of the generally top area of the HDCF device and system 30, 32. These prototypes show the following components: the general Heavy Duty Centrifugal Feeder (HDCF) device and system 30; prototype 32 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; parts being oriented and fed through Heavy Duty Centrifugal Feeder (HDCF); removable pick-up eyebolt 99; and threaded aperture 99A—in the end of the main shaft 45—for the eyebolt 99.

FIGS. 9 A, 9 B and 9 F are sketches of the support castors 60 for the HDCF device and system 30, 32 plus the wiper 53 and wiper support 53A. The support 53A for wiper 53 connected to disk plate 43. FIGS. 9 C through 9 E are depictions of the general parts infeed conveyor 70 for the HDCF device and system 30, 32. In these views the prototype provides: the general Heavy Duty Centrifugal Feeder (HDCF) device and system 30; prototype 32 the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; rigid inner disk base plate 43; HDCF vertical drive shaft 45; at least two bearings 46 for rotationally securing drive shaft 45 to HDCF support structure; aperture 48 at perimeter of rigid inner disk base plate 43 which permits oil from parts 90 to drain and divert to oil cleanout tray 49; oil cleanout tray 49; HDCF support structure and enclosure 50; access door 51 on surface 40A of feeder device for maintenance and component replacement; surface 52 of support 50; mounting fasteners 54 of bowl 40 to top surface of support 52; HDCF support castors 60; parts infeed conveyor 70 with random parts 90; and flexible chain/belt 71 for infeed conveyer 70. Other means of fastening in addition to fasteners 54 include those of threaded fasteners, rods and cotter pins, weldments, quick clamps, and rivets.

Figure 10:
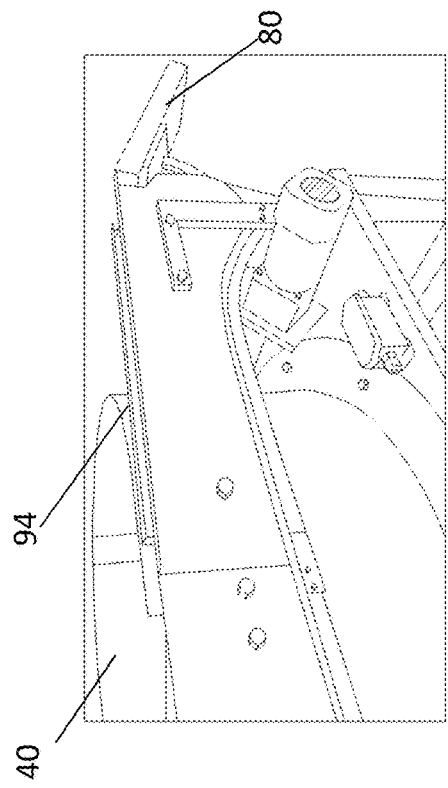
FIGS. 10A through 10D are depictions of other general components of the HDCF device and system.
Figure 10:
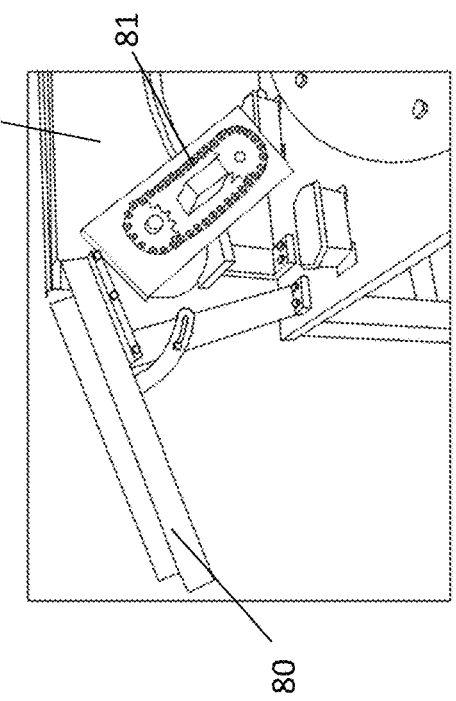
Figure 10:
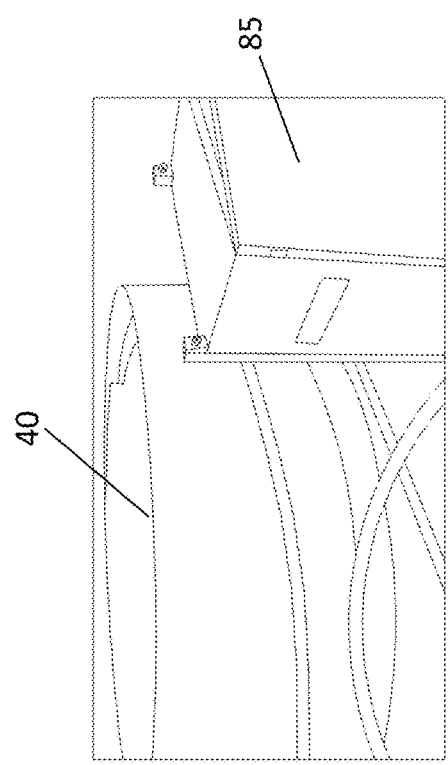
Figure 10:
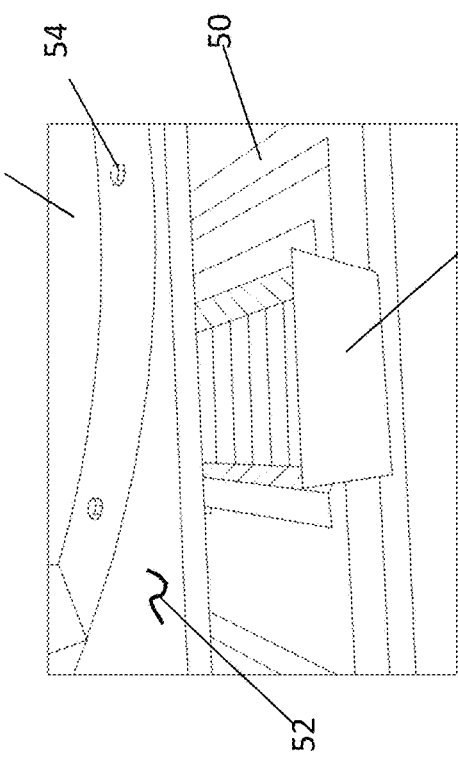
Figure 11A:
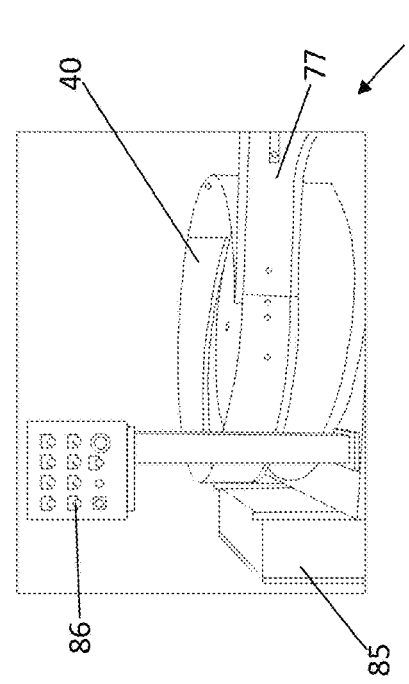
FIGS. 11A through 11D are sketches of the electrical control panel and sketches showing the operation for the HDCF device and system.
Figure 11B:
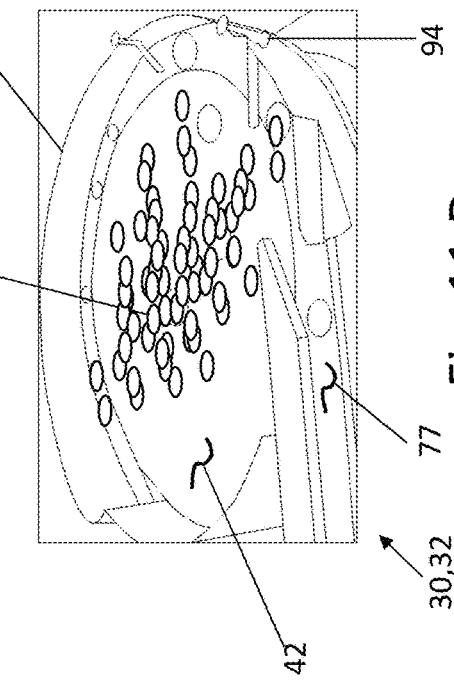
Figure 11C:
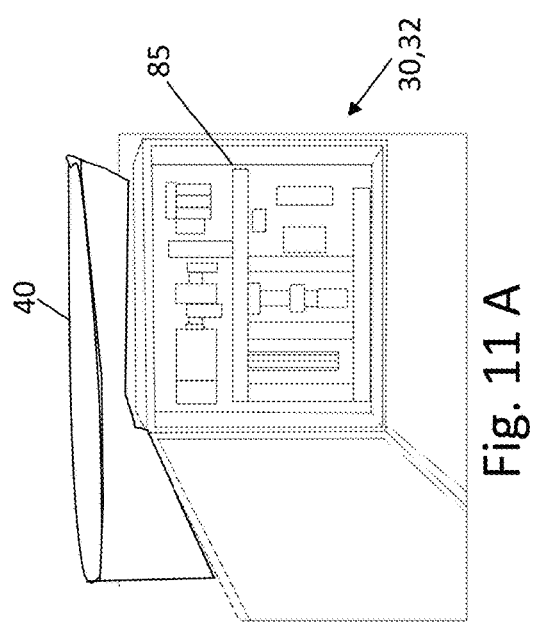
Figure 11D:
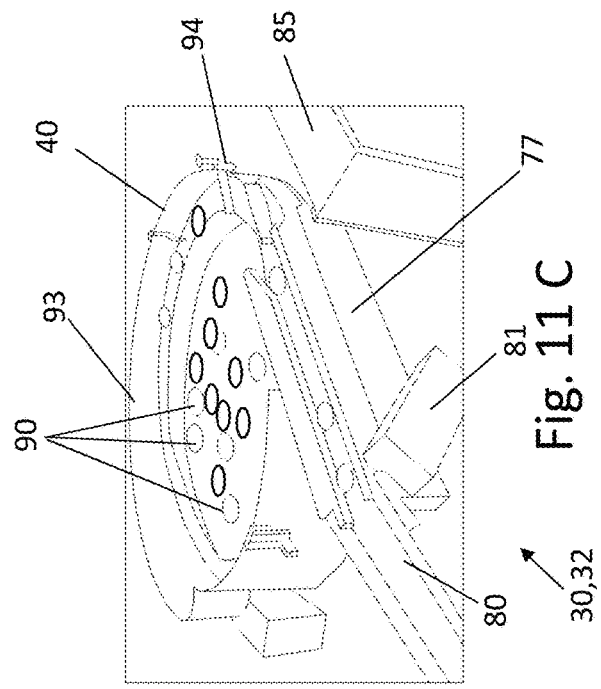

FIGS. 10 A through 10 D are depictions of other general prototype components of the HDCF device and system 30, 32. Components displayed here are: the general Heavy Duty Centrifugal Feeder (HDCF) device and system 30; prototype 32 the general Heavy Duty Centrifugal Feeder (HDCF) device and system 30; Heavy Duty Centrifugal Feeder (HDCF) bowl 40; exterior surface 40A of Feeder (HDCF) bowl 40; oil cleanout tray 49; HDCF support structure and enclosure 50; surface 52 of support 50; mounting fasteners 54 of bowl 40 to top surface of support 52; parts output/exit or off-feed conveyor 77 with oriented parts 90; adjustable (vertically and laterally) exit chute 80; drive system 81 for exit conveyor 77; and discharge tooling (size and orientation) and zone 94.

FIGS. 11 A and 11 B are sketches of the electrical control panels for the HDCF device and system 30, 32. The components revealed in these sketches include: 30, 32. The general Heavy Duty Centrifugal Feeder (HDCF) device and system 30; prototype 32 the general Heavy Duty Centrifugal Feeder (HDCF) device and system 30; Heavy Duty Centrifugal Feeder (HDCF) bowl 40; parts output/exit or off-feed conveyor 77 with oriented parts 90; electrical power and control panel 85; and HDCF operator control box 86.

FIGS. 11 C and 11 D are sketches showing the operation of the HDCF device and system 30, 32. This is discussed in the Operations Section.

Figure 13:
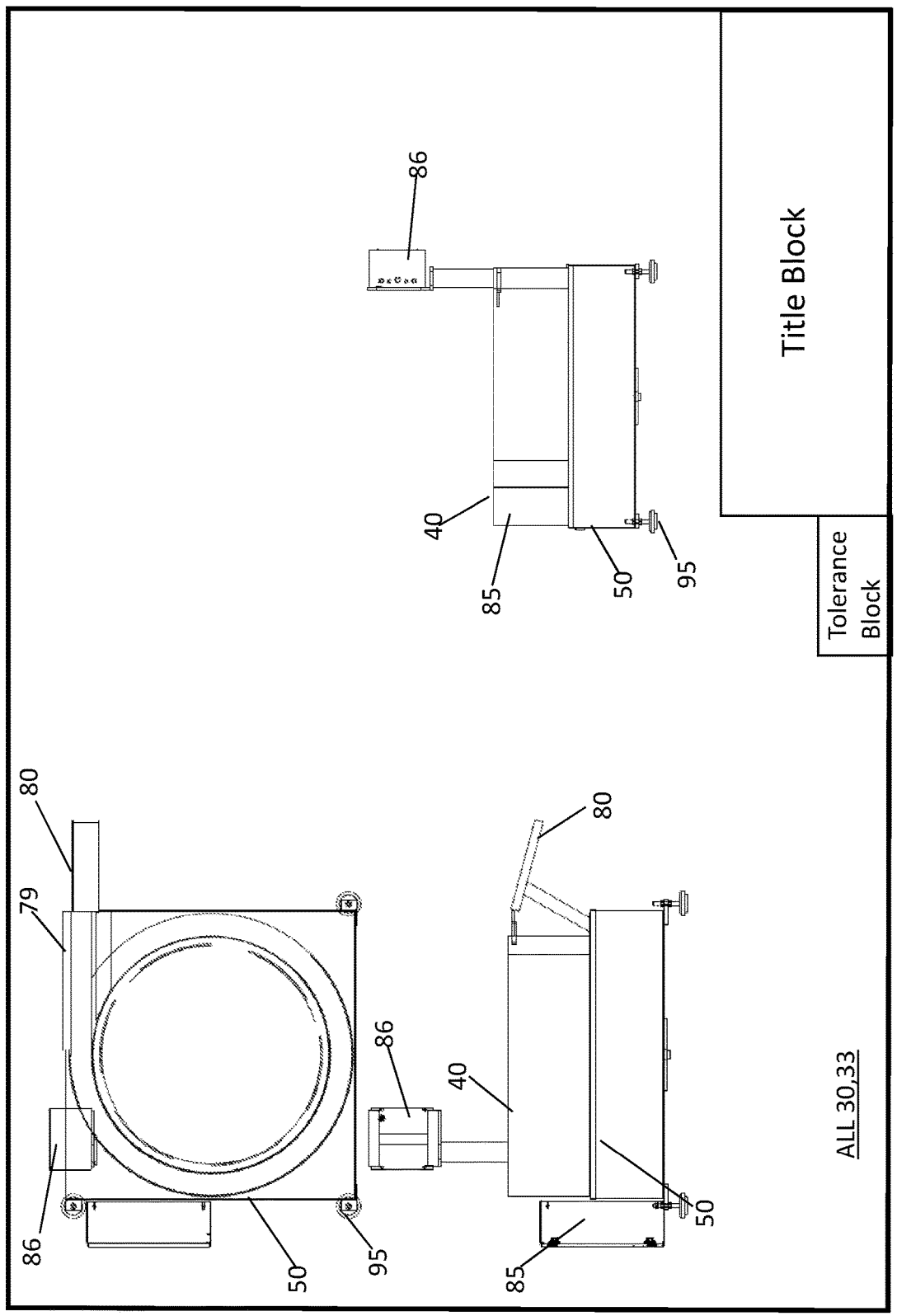
Figure 14:
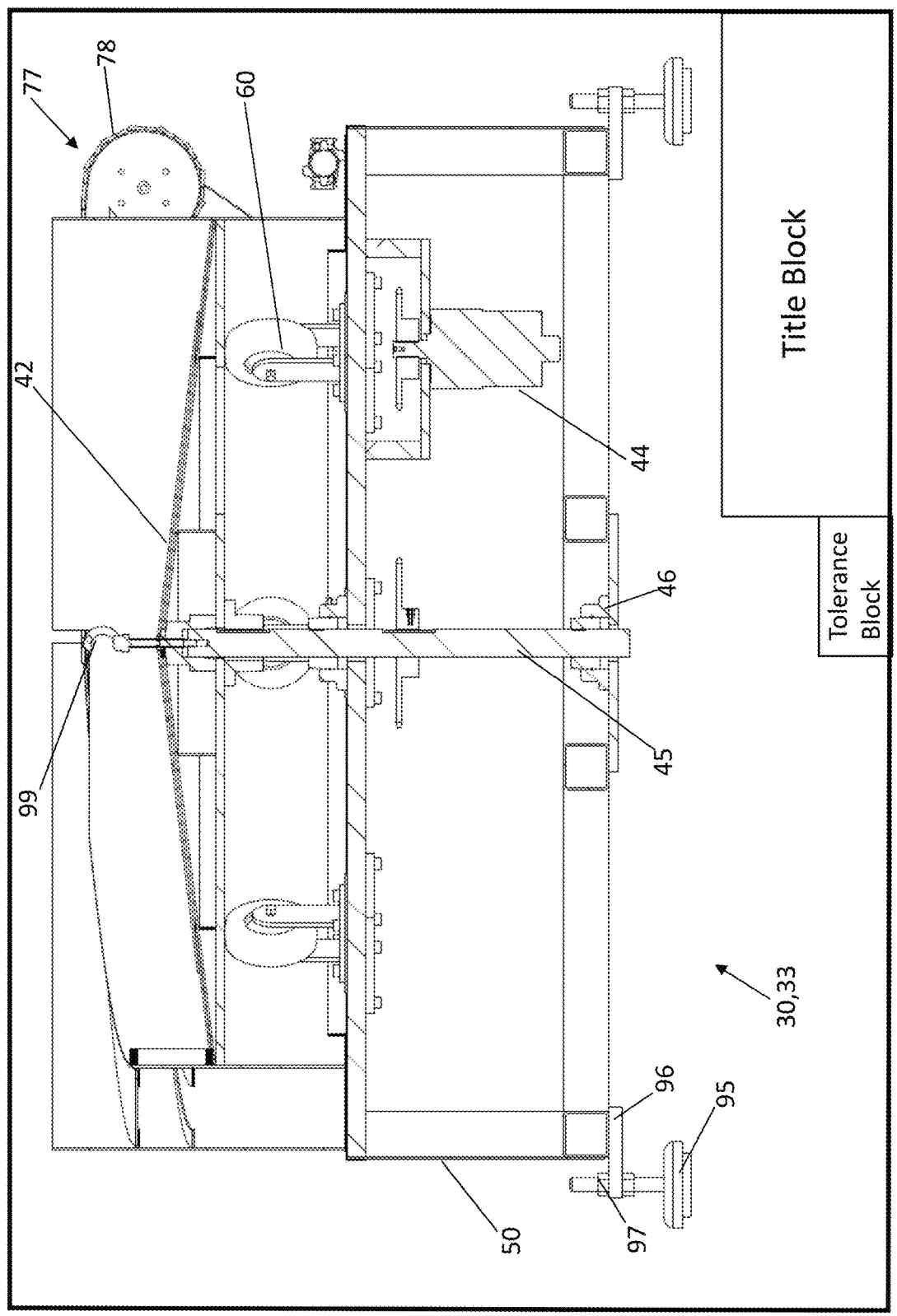

FIGS. 12, 13, and 14 are manufacturing tool and production assembly drawings 33 for the HDCF device and system 30. These drawings show:

FIG. 12: the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; speed sensor 41; oil cleanout tray 49; HDCF support structure and enclosure 50; surface 52 of support 50; HDCF support castors 60 (a plurality, preferred 6); parts infeed conveyor 70 with random parts 90; flexible chain/belt 71 for infeed conveyor 70; parts output/exit or off-feed conveyor 77 with oriented parts 90; flexible chain/belt 78 for output conveyer 77; photo sensor 79 on exit conveyor 77; adjustable (vertically and laterally) exit chute 80; drive system 81 for exit conveyor 77; electrical power and control panel 85; HDCF operator control box 86; selection tooling (orientation and quantity) and zone 93; discharge tooling (size and orientation) and zone 94; HDCF leveling pads/feet 95; removable pick-up eyebolt 99; threaded aperture 99A—in the end of the main shaft 45—for the eyebolt 99; and high level sensor 100—stops bowl 40 and allows exit conveyor 77 to empty.

FIG. 13: the general Heavy Duty Centrifugal Feeder (HDCF) device and system 30; design drawings 33 the general Heavy Duty Centrifugal Feeder (HDCF) device and system 30; Heavy Duty Centrifugal Feeder (HDCF) bowl 40; HDCF vertical drive shaft 45; HDCF support structure and enclosure 50; HDCF support castors 60; parts infeed conveyor 70 with random parts 90; parts output/exit or off-feed conveyor 77; flexible chain/belt 78 for output conveyer 77; photo sensor 79 on exit conveyor 77; adjustable (vertically and laterally) exit chute 80; electrical power and control panel 85; HDCF operator control box 86; and HDCF leveling pads/feet 95. And, FIG. 14: the general Heavy Duty Centrifugal Feeder (HDCF) device and system 30; solid drawings 31 the general Heavy Duty Centrifugal Feeder (HDCF) device and system 30; Heavy Duty Centrifugal Feeder (HDCF) bowl 40; exterior surface 40A of Feeder (HDCF) bowl 40; dimpled stainless steel or equal durable material cone cap 42; rigid inner disk base plate 43; electrical drive motor and gear box 44 to rotationally turn/spin the centrifugal base plate 43; HDCF vertical drive shaft 45; at least two bearings 46 for rotationally securing drive shaft 45 to HDCF support structure; drive system 47—chain/belts between drive and driven sprockets/pulleys between drive 44 and shaft 45; aperture 48 at perimeter of rigid inner disk base plate 43 which permits oil from parts 90 to drain and divert to oil cleanout tray 49; oil cleanout tray 49; HDCF support structure and enclosure 50; HDCF support castors 60 (a plurality, preferred 6); means for securing 61 castors 60 to support plate 62; support base plate 62; clamping plate 63 for castors 60; parts infeed conveyor 70 with random parts 90; flexible chain/belt 71 for infeed conveyer 70; and parts output/exit or off-feed conveyor 77 with oriented parts 90.

The details mentioned here are exemplary and not limiting. Other specific components and manners specific to describing a Heavy Duty Centrifugal Feeder device and system 30 may be added as a person, having ordinary skill in the field of parts feeding and orientation devices and systems devices and their uses, well appreciates.

Operation of the Preferred Embodiment

The Heavy Duty Centrifugal Feeder device and system 30 has been described in the above embodiment. The manner of how the device operates is described below. One notes well that the description above and the operation described here must be taken together to fully illustrate the concept of the HDCF device and system 30. The preferred embodiment of a heavy duty centrifugal bowl parts feeder system comprised of: a). a feeder bowl system having a bowl, an electrical drive assembly and a shaft connected to an inner disk and further comprising a set of selection tooling and discharge tooling affixed to the top of the bowl; b). a support structure contiguous and beneath the feeder bowl, the support structure having a top surface; c). a means for securing the feeder bowl to the support structure; d). an input parts conveyor and an output parts conveyor; and e). a heavy duty support package comprised of: 1) an approximately ⅜" thick inner disc base plate for maximum rigidity; 2) a dimpled stainless steel "cone" cap over inner disc to reduce surface contact; 3) a plurality of heavy duty casters mounted under the inner disc to support the weight and to tighten flatness tolerance of the disc wherein the casters are mounted from underneath which allows for easy maintenance; 4) the inner disc is inset slightly leaving an aperture/crack to allow oil on parts to disperse in the aperture/crack; 5) a wiper 53 mounted to bottom of the disc 43 which cleans the disk from the bottom of the disk by pushing oil into a hole in a base plate 60 and into a collection tray 49; 6) a variable speed control on the drive of the of the inner disc controlled by a photo eye; and 7) an angle chute with an adjustable discharge angle wherein the heavy duty centrifugal bowl parts feeder system can feed and orient relatively heavy parts, being small, heavy part (1-6 inches in diameter and ½ to 5 pounds apiece) may be oriented and conveyed by a centrifugal parts feeder system.

The heavy duty centrifugal bowl parts feeder system and device 30 operates somewhat similar to a conventional centrifugal feeder bowl system. The parts are fed in a random order usually with a conveyor. Selection tooling helps orient the parts and discharge tooling assures parts are singularly fed in the specifically desired orientation. Sensors help control the feed rate. Other common features of a standard centrifugal system—there are high feed rates which increases productivity; there is flexibility to handle different size parts in the same "family"—which can then be automated for no touch changeover between part sizes; and a modular platform can be easily adapted to existing units.

The heavy duty centrifugal feeder can do these same things in operation, however, it has a heavy duty package which includes all or most of the following operative advantages: the HDCF uses a ⅜" thick inner disc base plate 43 for maximum rigidity; it offers a dimpled stainless steel "cone" cap 43 over inner disc 43 to reduce surface contact during parts movement; it uses a plurality (normally 6) heavy duty casters 60 that are mounted under inner disc 43 to help support the heavier weight and to tighten flatness tolerance of the disc; the casters 60 are mounted from underneath to allow for easy maintenance; there is an inner disc 43 which is inset slightly (with a crack or aperture 48) to allow oil on parts 90 to disperse in the crack 48; the oil then runs down sidewall and into a collection tray 49; the HDCF provides a wiper 53 mounted by a support 53A to bottom of the disc 43 which cleans the tray by pushing oil into a hole in the base plate 62 and into a collection tray 49; there is an access door 51 in sidewall 40A of the feeder 40 for easy access to drive bearing components 60, 45, 46, 44; the speed of inner disc 43 is varied depending on part level in feeder based on condition of photo eye 79; there is a Flexlink conveyor 70 is integrated around the inner disc 43 to bring parts 90 from the center of the feeder and incline them to orientation tooling; the HDCF utilizes selection tooling 93 which can be attached to the sidewall 40A where mis-oriented parts 90 can then be rejected back into the center for recirculation; the HDCF utilizes discharge tooling 94 which is adjustable to accommodate wide range of sizes; and the parts 90 discharge from the feeder uses a down angle chute 80 and discharge angle that is vertically and laterally adjustable.

FIGS. 11 C and 11 D are sketches showing the operation of the HDCF device and system 30, 32. Demonstrated in these operation drawings are: the general Heavy Duty Centrifugal Feeder (HDCF) device and system 30; prototype 32 the general Heavy Duty Centrifugal Feeder (HDCF) device and system 30; Heavy Duty Centrifugal Feeder (HDCF) bowl 40; dimpled stainless steel or equal durable material cone cap 42; parts infeed conveyor 70 with random parts 90; flexible chain/belt 71 for infeed conveyer 70; parts output/ exit or off-feed conveyor 77 with oriented parts 90; adjustable (vertically and laterally) exit chute 80; drive system 81 for exit conveyor 77; electrical power and control panel 85; parts 90 being oriented and fed through Heavy Duty Centrifugal Feeder (HDCF); selection tooling (orientation and quantity) and zone 93; and discharge tooling (size and orientation) and zone 94.

Many uses are anticipated for the Heavy Duty Centrifugal Feeder (HDCF) system and device 30. Some examples, and not limitations, are various relatively heavy part feeding (such as automotive bearings, gears, castings etc.) applications. Taught here are the ways a small, heavy part (1-6 inches in diameter and ½ to 5 pounds apiece) may be oriented and conveyed by a centrifugal parts feeder system.

With this description it is to be understood that the Heavy Duty Centrifugal Feeder device and system 30 is not to be limited to only the disclosed embodiment of product. The features of the HDCF device and system 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A heavy duty centrifugal bowl parts feeder system comprised of:
   a). a feeder bowl system;
   b). a support structure contiguous to and beneath the feeder bowl system, the support structure having a top surface;
   c). a means for fastening the feeder bowl system to the support structure;
   d). an input parts conveyor;
   e). an output parts conveyor; and f). a heavy duty support package for the feeder bowl system comprising:
 1) an at least approximately ⅜" thick inner disc base plate for maximum rigidity;
 2) a cone cap made of a durable/high impact material;
 3) a plurality of at least three heavy duty casters mounted under the inner disc to support a plurality of the heavy, small parts and to allow for easy maintenance;
 4) an aperture/round crack formed by an inset of the inner disc, the aperture/round crack allowing an amount of an oil on the small, heavy parts to disperse into the aperture/crack;
 5) a wiper mounted to a bottom of the inner disc which cleans the bottom by pushing the oil into a hole in a base plate and into a collection tray;
 6) a variable speed control on the drive of the of the inner disc controlled by a photo eye; and
 7) an angle chute with an adjustable discharge angle
wherein the heavy duty centrifugal bowl parts feeder system can feed and orient relatively heavy, small parts the parts being ½ to 5 pounds apiece and one to six inches in diameter.

2. The heavy duty centrifugal bowl parts feeder system according to claim 1 wherein the feeder bowl system is further comprising a bowl; an electrical drive assembly and a shaft, the shaft being connected to an inner disk; and a set of selection tooling and discharge tooling affixed to the top of the bowl.

3. The heavy duty support package of claim 2 wherein the durable/high impact material of the cone cap is selected from a group consisting of a dimpled stainless steel, a high density polyethylene (HDPE), a High Impact Polystyrene (HIP), a reinforced nylon, a reinforced urethane, a type of steel alloy, and a high impact composite materials.

4. The heavy duty support package of claim 2 wherein the plurality of at least three heavy duty casters is selected from a group consisting four castors, five castors, and six castors.

5. A heavy duty centrifugal bowl parts feeder system comprised of:
 a). a feeder bowl system comprising a bowl; an electrical drive assembly and a shaft, the shaft being connected to an inner disk; and a set of selection tooling and discharge tooling affixed to the top of the bowl having a bowl, an electrical drive assembly and a shaft connected to an inner disk and further comprising a set of selection tooling and discharge tooling affixed to the top of the bowl;
 b). a support structure contiguous and beneath the feeder bowl, the support structure having a top surface;
 c). a means for fastening the feeder bowl to the support structure;
 d). an input parts conveyor;
 e). an output parts conveyor; and
 f). a heavy duty support package for the feeder bowl system comprising:
  1) an at least approximately ⅜" thick inner disc base plate for maximum rigidity;
  2) a cone cap made of a durable/high impact material;
  3) a plurality of at least three heavy duty casters mounted under the inner disc to support a plurality of the heavy, small parts and to allow for easy maintenance;
  4) an aperture/round crack formed by an inset of the inner disc, the aperture/round crack allowing an amount of an oil on the small, heavy parts to disperse into the aperture/crack;
  5) a wiper mounted to a bottom of the inner disc which cleans the bottom by pushing the oil into a hole in a base plate and into a collection tray;
  6) a variable speed control on the drive of the of the inner disc controlled by a photo eye; and
  7) an angle chute with an adjustable discharge angle
 wherein the heavy duty centrifugal bowl parts feeder system can feed and orient relatively heavy, small parts the parts being ½ to 5 pounds apiece and one to six inches in diameter.

6. The heavy duty support package of claim 5 wherein the durable/high impact material of the cone cap is selected from a group consisting of a dimpled stainless steel, a high density polyethylene (HDPE), a High Impact Polystyrene (HIP), a reinforced nylon, a reinforced urethane, a type of steel alloy, and a high impact composite materials.

7. The heavy duty support package of claim 5 wherein the plurality of at least three heavy duty casters is selected from a group consisting four castors, five castors, and six castors.

8. The heavy duty centrifugal bowl parts feeder system according to claim 5 wherein the means for fastening the feeder bowl to the support structure is selected from a group consisting of threaded fasteners, rods and cotter pins, weldments, quick clamps, and rivets.

9. The heavy duty centrifugal bowl parts feeder system according to claim 1 wherein the means for fastening the feeder bowl to the support structure is selected from a group consisting of threaded fasteners, rods and cotter pins, weldments, quick clamps, and rivets.

\* \* \* \* \*